(12) United States Patent
Nishinaka et al.

(10) Patent No.: US 10,480,736 B2
(45) Date of Patent: *Nov. 19, 2019

(54) DAYLIGHTING SYSTEM

(71) Applicant: SHARP KABUSHIKI KAISHA, Sakai, Osaka (JP)

(72) Inventors: Shumpei Nishinaka, Sakai (JP); Shun Ueki, Sakai (JP); Toru Kanno, Sakai (JP); Daisuke Shinozaki, Sakai (JP); Hideomi Yui, Sakai (JP); Tomoko Ueki, Sakai (JP); Tsuyoshi Kamada, Sakai (JP); Atsuyuki Hoshino, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/569,732

(22) PCT Filed: Apr. 26, 2016

(86) PCT No.: PCT/JP2016/063053
§ 371 (c)(1),
(2) Date: Oct. 26, 2017

(87) PCT Pub. No.: WO2016/175207
PCT Pub. Date: Nov. 3, 2016

(65) Prior Publication Data
US 2018/0128441 A1 May 10, 2018

(30) Foreign Application Priority Data

Apr. 30, 2015 (JP) ................................ 2015-093619

(51) Int. Cl.
*F21S 11/00* (2006.01)
*E06B 9/24* (2006.01)
(Continued)

(52) U.S. Cl.
CPC .......... *F21S 11/007* (2013.01); *E06B 3/6715* (2013.01); *E06B 5/00* (2013.01); *E06B 9/386* (2013.01);
(Continued)

(58) Field of Classification Search
CPC .................. F21S 11/007; F21S 11/002; E06B 2009/2405
See application file for complete search history.

(56) References Cited

U.S. PATENT DOCUMENTS

| 4,773,733 A | 9/1988 | Murphy, Jr. et al. |
| 6,196,292 B1 | 3/2001 | Jackson |

(Continued)

FOREIGN PATENT DOCUMENTS

| CN | 1392959 A | 1/2003 |
| JP | 63-040494 U | 3/1988 |

(Continued)

OTHER PUBLICATIONS

International Search Report; dated Aug. 2, 2016; PCT/JP2016/063053; PCT.

(Continued)

*Primary Examiner* — Christopher E Mahoney
(74) *Attorney, Agent, or Firm* — ScienBiziP, P.C.

(57) ABSTRACT

A daylighting system (10) to be installed over an interior face (1001*a*) of a window pane (1001), the daylighting system (10) including: a light-transmitting device (20) to be disposed over an upper part of the interior face (1001*a*) of the window pane (1001); and a shading device (30) joined to the light-transmitting device (20) in such a manner as to be disposed over a lower part of the interior face (1001*a*) of the window pane (1001).

14 Claims, 18 Drawing Sheets

(51) Int. Cl.
*E06B 5/00* (2006.01)
*E06B 9/386* (2006.01)
*F21V 3/00* (2015.01)
*F21V 5/02* (2006.01)
*F21V 5/04* (2006.01)
*F21V 11/04* (2006.01)
*G02B 5/00* (2006.01)
*G02B 5/04* (2006.01)
*E06B 3/67* (2006.01)
*F21V 14/08* (2006.01)

(52) U.S. Cl.
CPC ............... *F21S 11/00* (2013.01); *F21V 3/00* (2013.01); *F21V 5/02* (2013.01); *F21V 5/04* (2013.01); *F21V 11/04* (2013.01); *F21V 14/08* (2013.01); *G02B 5/00* (2013.01); *G02B 5/04* (2013.01); *E06B 2009/2405* (2013.01)

(56) References Cited

U.S. PATENT DOCUMENTS

| | | | |
|---|---|---|---|
| 6,966,673 | B1 | 11/2005 | Oyama |
| 9,810,389 | B2 | 11/2017 | Nango et al. |
| 9,817,161 | B2* | 11/2017 | Hao ............... G02B 19/0042 |
| 2008/0291541 | A1* | 11/2008 | Padiyath ............... E06B 9/24 359/569 |
| 2011/0043919 | A1 | 2/2011 | Ko et al. |
| 2011/0259529 | A1 | 10/2011 | Clear |
| 2014/0016191 | A1 | 1/2014 | Yeh et al. |
| 2014/0104689 | A1* | 4/2014 | Padiyath ............ G02B 5/0242 359/592 |
| 2014/0198390 | A1* | 7/2014 | Padiyath ............ G02B 5/045 359/591 |
| 2015/0129140 | A1* | 5/2015 | Dean ..................... E06B 9/24 160/5 |
| 2015/0226394 | A1 | 8/2015 | Ueki et al. |
| 2016/0025288 | A1 | 1/2016 | Vasylyev |
| 2016/0060954 | A1 | 3/2016 | Nishida et al. |
| 2016/0069524 | A1* | 3/2016 | Dai ..................... F21S 11/007 359/591 |
| 2016/0178164 | A1* | 6/2016 | Nishida ............... E06B 9/303 359/596 |
| 2016/0186949 | A1* | 6/2016 | Sekido ................. E06B 9/28 359/597 |
| 2016/0223155 | A1* | 8/2016 | Nango .................. E06B 9/24 |
| 2016/0252225 | A1 | 9/2016 | Tsujimoto et al. |
| 2017/0138124 | A1* | 5/2017 | Kanno ................. E06B 9/386 |
| 2017/0146207 | A1 | 5/2017 | Nishinaka et al. |
| 2017/0299135 | A1* | 10/2017 | Sekido ................. E06B 9/28 |

FOREIGN PATENT DOCUMENTS

| | | | | |
|---|---|---|---|---|
| JP | 2695545 | B2 | 12/1997 | |
| JP | 2001-003661 | A | 1/2001 | |
| JP | 2002-270015 | A | 9/2002 | |
| JP | 3120889 | U | 3/2006 | |
| JP | 2010-067565 | A | 3/2010 | |
| JP | 2013-002224 | A | 1/2013 | |
| JP | 2013-014909 | A | 1/2013 | |
| JP | 2013-156554 | A | 8/2013 | |
| JP | 2014-015831 | A | 1/2014 | |
| JP | WO 2014189061 | A1* | 11/2014 | ........... E06B 9/303 |
| JP | WO 2014200113 | A1* | 12/2014 | ............ E06B 9/28 |
| JP | 2015-001083 | A | 1/2015 | |
| WO | 2015/046336 | A1 | 4/2015 | |
| WO | 2015/056736 | A1 | 4/2015 | |
| WO | 2015/076245 | A1 | 5/2015 | |
| WO | 2015/174397 | A1 | 11/2015 | |
| WO | 2016/002869 | A1 | 1/2016 | |

OTHER PUBLICATIONS

International Search Report dated Aug. 2, 2016 in PCT/JP2016/063045.
Non-final Rejection dated Apr. 6, 2018 in U.S. Appl. No. 15/569,668.
Final Rejection dated Sep. 5, 2018 in U.S. Appl. No. 15/569,668.
Notice of Allowability dated Dec. 17, 2018 in U.S. Appl. No. 15/569,668.

* cited by examiner

DAYLIGHTING SYSTEM

TECHNICAL FIELD

The present invention relates to daylighting systems.

The present application claims priority to Japanese Patent Application, Tokugan, No. 2015-093619 filed in Japan on Apr. 30, 2015, the entire contents of which are incorporated herein by reference.

BACKGROUND ART

Daylighting devices containing a daylighting film are conventionally installed over a face of a window pane to efficiently allow external light such as sunlight incident on a window pane to enter the room (see, for example, Patent Literature 1).

CITATION LIST PATENT LITERATURE

Patent Literature 1: Japanese Unexamined Patent Application Publication, Tokukai, No. 2013-156554

SUMMARY OF INVENTION

Technical Problem

When a daylighting device is installed over a face of a window pane, the part of the window pane that is lower than the daylighting device needs to be shaded in order to block glaring direct light and allow indoors only the light leaving the daylighting device in the direction of the ceiling. However, when a conventional window shade or roll screen is installed for shading purposes, the window shade or roll screen can only either block light across the entire window or leave the entire window or a lower part of the window open (by being wound up over a face of the window pane).

For example, to install a window shade or roll screen below the daylighting device by attaching the window shade or roll screen to the daylighting device, a headbox needs to be provided separately into which the window shade or roll screen is retracted when it is rolled up. That need in turn requires refurbishment of the building itself, which will be problematically extensive.

Alternatively, if a window shade or roll screen is to be installed below the daylighting device by hanging down from the daylighting device, the window shade adds to the total weight of the system including the daylighting device. The fittings for holding this daylighting device need to have considerable strength. Another problem is that the center of gravity of the daylighting device could shift, rendering it difficult to dispose the daylighting device with the light-receiving face thereof parallel to a face of the window pane.

Conceived in view of these problems, the present invention, in one aspect thereof, has an object to provide a daylighting system that is easy to install and capable of blocking glaring direct light and allowing only the light directed at the ceiling to enter the room.

Solution to Problem

The present invention in an aspect thereof relates to a daylighting system to be installed over an interior face of a window pane, the daylighting system including: a light-transmitting device to be disposed over an upper part of the interior face of the window pane; and a shading device joined to the light-transmitting device in such a manner as to be disposed over a lower part of the interior face of the window pane.

In a daylighting system in accordance with another aspect of the present invention, the light-transmitting device may include light-transmitting slats, and the shading device may include shading slats.

A daylighting system in accordance with yet another aspect of the present invention may further include a daylighting device disposed over the light-transmitting device.

In a daylighting system in accordance with still another aspect of the present invention, the daylighting device may include: a base member having light-transmitting properties; and a plurality of protrusion portions having light-transmitting properties disposed adjacent to each other on a face of the base member.

In a daylighting system in accordance with yet still another aspect of the present invention, the light-transmitting device may be anisotropic with respect to light-diffusion direction in such a manner that the light-transmitting device is highly diffusive in horizontal directions.

In a daylighting system in accordance with a further aspect of the present invention, the light-transmitting device may have a prismatic structure that changes a traveling direction of light vertically.

In a daylighting system in accordance with yet a further aspect of the present invention, the prismatic structure may include two or more types of prismatic structures in accordance with distance from a ceiling.

In a daylighting system in accordance with still a further aspect of the present invention, the daylighting device may be disposed over the interior face of the window pane.

In a daylighting system in accordance with yet still a further aspect of the present invention, the window pane may include multilayered glass including a pair of glass plates face to face at a distance, and the daylighting device may be provided inside the multilayered glass.

A daylighting system in accordance with an additional aspect of the present invention may further include a light-diffusion device configured to diffuse light over the daylighting device.

In a daylighting system in accordance with another aspect of the present invention, the light-transmitting device may include composite slats each in turn including: a shading section over a face of the window pane; and a light-transmitting section joined obliquely to the shading section.

In a daylighting system in accordance with a further aspect of the present invention, the light-transmitting device and the shading device may be capable of being independently moved up/down over the face of the window pane.

If the light-transmitting device is of a window shade type, individual slats are preferably openable/closable independently.

Advantageous Effects of Invention

The present invention, in one aspect thereof, provides a daylighting system that is easy to install and capable of blocking glaring direct light and allowing only the light directed at the ceiling to enter the room.

DESCRIPTION OF EMBODIMENTS

The following will describe embodiments of the daylighting system of the present invention.

The embodiments disclosed herein serve solely to illustrate the spirit of the invention in a specific manner and unless otherwise mentioned, by no means limit the scope of the invention.

Daylighting System

First Embodiment

Figure 1A:
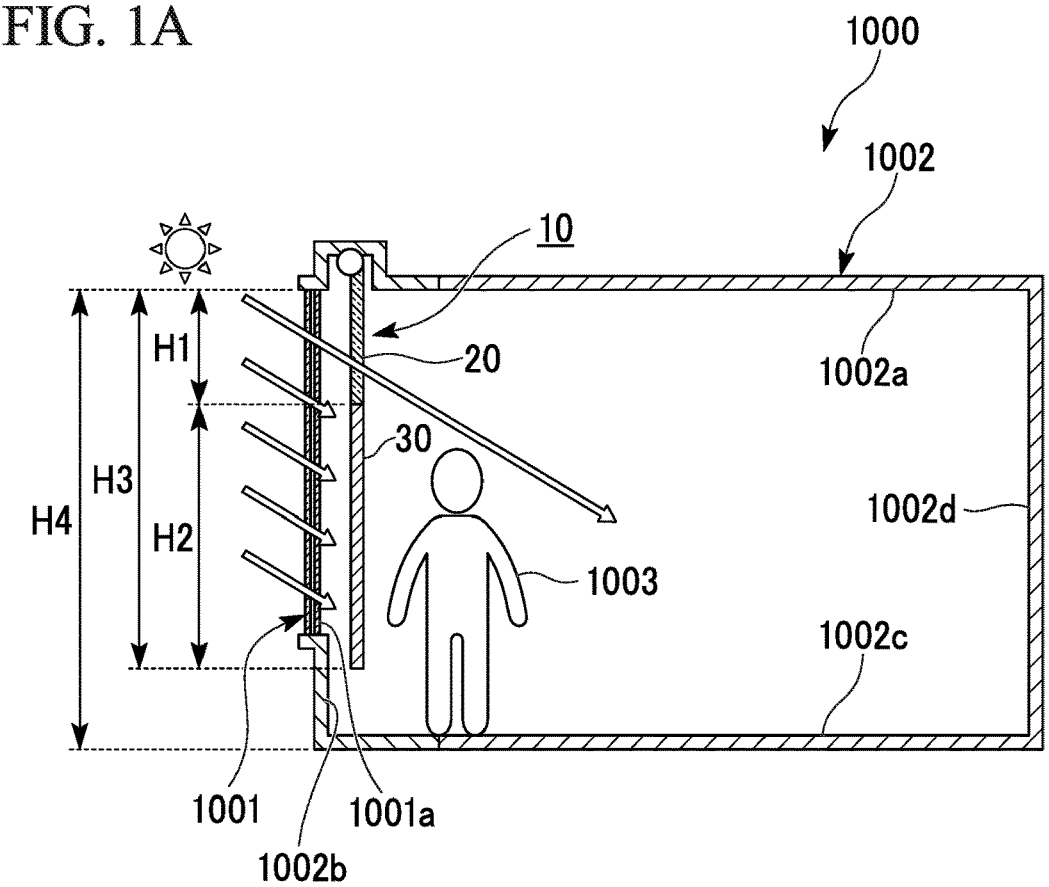
FIG. 1A is a schematic cross-sectional view of a configuration of a daylighting system in accordance with a first embodiment of the present invention.
Figure 1B:
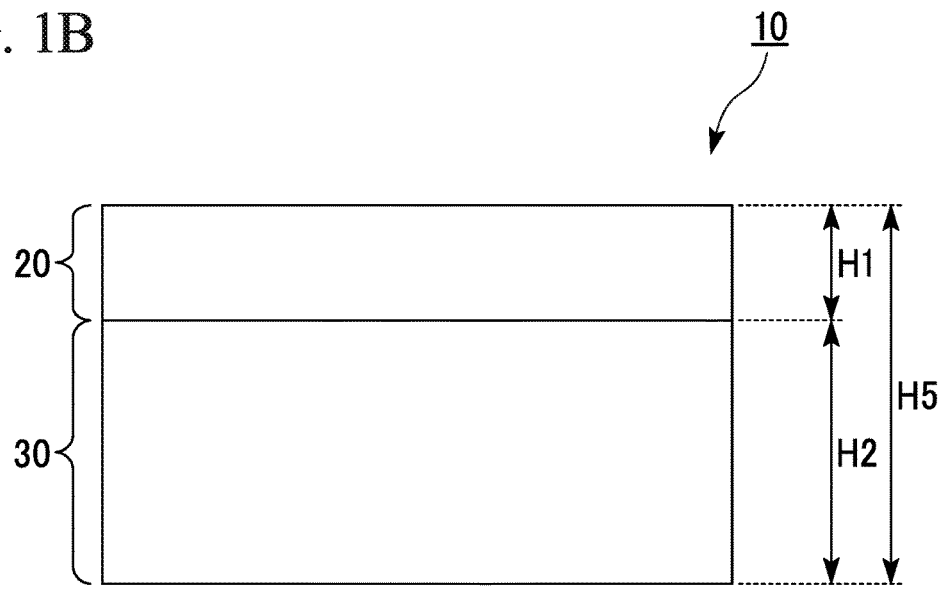
FIG. 1B is a schematic front view of the configuration of the daylighting system in accordance with the first embodiment of the present invention.

FIGS. 1A and 1B are a schematic cross-sectional view and a schematic front view, respectively, of a configuration of a daylighting system in accordance with a first embodiment of the present invention.

In FIGS. 1A and 1B, the reference number 1000 indicates a room model, the reference number 1001 a window pane, the reference number 1002 a room, the reference number 1002a a ceiling, the reference number 1002b a wall that is hit by sunlight, the reference number 1002c a floor, the reference number 1002d a wall located opposite the wall 1002b, and the reference number 1003 a person standing on the floor 1002c.

As shown in FIG. 1A, the room 1002 is an office room as an example and has a rectangular cross-section (X-Z cross-section). The room 1002 has a height H4 (as measured from the floor 1002c to the ceiling 1002a) of, for example, 2.7 meters. The window pane 1001 is located in the wall 1002b, 1.8 meters down from the ceiling 1002a, as an example. The window pane 1001 has a height H3 of, for example, 1.8 meters.

A daylighting system 10 in accordance with the present embodiment includes: a light-transmitting device 20 disposed inside the room 1002 over an interior face (indoor face) 1001a of the window pane 1001 in such a manner as to face an tipper part of the interior face 1001a of the window pane 1001 (near the ceiling 1002a); and a shading device 30, joined to the light-transmitting device 20, over a lower part of the interior face 1001a of the window pane 1001 (near the floor 1002c).

"The shading device 30 being joined to the light-transmitting device 20" means that the shading device 30 hangs down from the light-transmitting device 20.

The light-transmitting device 20, being a part of the daylighting system 10, is installed over such a part of the interior face 1001a of the window pane 1001 that the light-transmitting device 20 does not come into the field of view of room occupants (for example, within 0.65 meters from the ceiling 1002a). The light-transmitting device 20 has a height H1 of, for example, 0.65 meters.

The shading device 30, being a part of the daylighting system 10, is installed over such a part of the interior face 1001a of the window pane 1001 that the shading device 30 blocks the field of view of room occupants (for example, from 0.65 meters to 1.8 meters below the ceiling 1002a). The shading device 30 has a height H2 of, for example, 1.15 meters.

That renders the height H5 of the daylighting system 10, which is a sum of the height H1 of the light-transmitting device 20 and the height H2 of the shading device 30, for example, equal to 1.8 meters.

The light-transmitting device 20 includes, for example, a roll screen, a curtain, or a vertical window shade, each of which is made of transparent material.

Examples of such transparent material include triacetyl cellulose (TAC) films, polyethylene terephthalate (PET) films, cycloolefin polymer (COP) films, polycarbonate (PC) films, polyethylene naphthalate (PEN) films, polyether sulfone (PES) films, polyimide (PI) films, and other like transparent films (base members).

The shading device 30 includes, for example, a roll screen, a curtain, or a vertical window shade, each of which is made of opaque material.

Examples of such opaque material include: aluminum foils; and films (base members) prepared by adding a pigment to triacetyl cellulose (TAC), polyethylene terephthalate (PET), cycloolefin polymer (COP), polycarbonate (PC), polyethylene naphthalate (PEN), polyether sulfone (PES), polyimide (PI), or another like transparent resin and molding the resultant substance into a predetermined shape.

The daylighting system 10 of the present embodiment is capable of blocking glaring direct light by means of the shading device 30 and allowing indoors only the light directed at the ceiling 1002a by the light-transmitting device 20. In addition, since the daylighting system 10 of the present embodiment includes the light-transmitting device 20 and the shading device 30, each of which in turn includes, for example, a roll screen, a curtain, or a vertical window shade, the daylighting system 10 can be readily installed over the interior face 1001a of the window pane 1001.

Second Embodiment

Figure 2A:
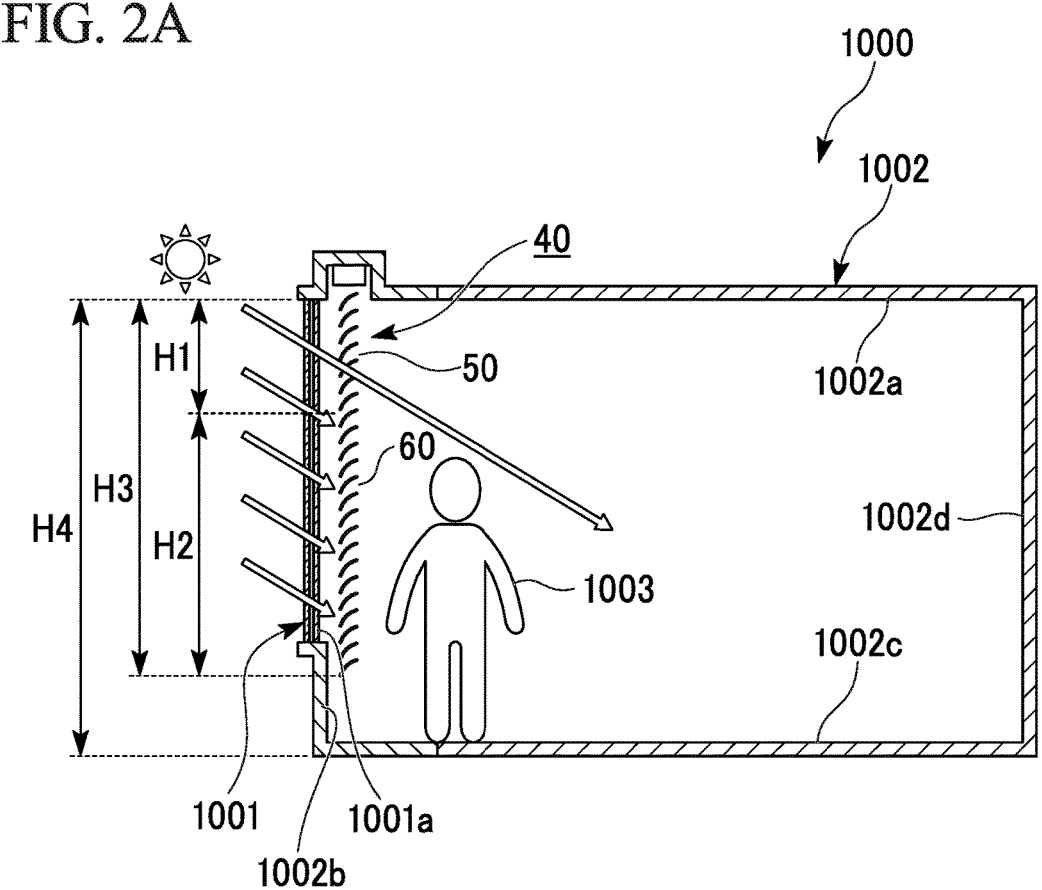
FIG. 2A is a schematic cross-sectional view of a configuration of a daylighting system in accordance with a second embodiment of the present invention.
Figure 2B:
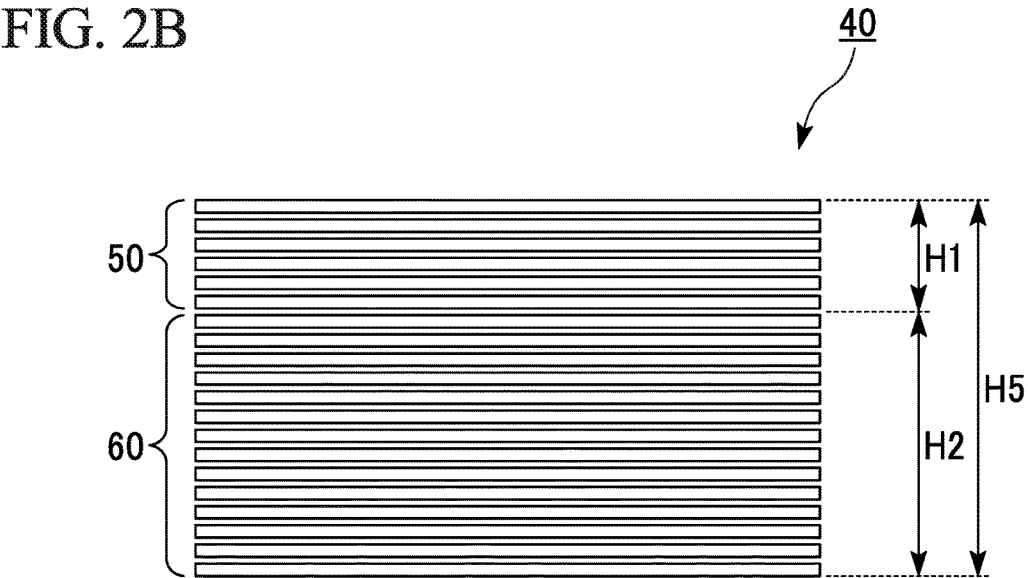
FIG. 2B is a schematic front view of the configuration of the daylighting system in accordance with the second embodiment of the present invention.

FIGS. 2A and 2B are a schematic cross-sectional view and a schematic front view, respectively, of a configuration of a daylighting system in accordance with a second embodiment of the present invention. Those members shown in FIGS. 2A and 2B which are the same as those in the daylighting system of the first embodiment shown in FIGS. 1A and 1B are indicated by the same reference signs or numerals, and description thereof is omitted.

A daylighting system 40 in accordance with the present embodiment includes: a tight-transmitting device 50 disposed inside the room 1002 over an interior face (indoor face) 1001a of the window pane 1001 in such a manner as to face an upper part of the interior face 1001a of the window pane 1001 (near the ceiling 1002a); and a shading device 60, joined to the light-transmitting device 50, over a lower part of the interior face 1001a of the window pane 1001 (near the floor 1002c).

"The shading device 60 being joined to the light-transmitting device 50" means that the shading device 60 hangs down from the light-transmitting device 50.

The light-transmitting device 50, being a part of the daylighting system 40, is installed over such a part of the interior face 1001a of the window pane 1001 that the light-transmitting device 50 does not come into the field of view of room occupants (for example, within 0.65 meters from the ceiling 1002a). The light-transmitting device 50 has a height H1 of, for example, 0.65 meters.

The shading device 60, being a part of the daylighting system 40, is installed over such a part of the interior face 1001a of the window pane 1001 that the shading device 60 blocks the field of view of room occupants (for example, from 0.65 meters to 1.8 meters below the ceiling 1002a), The shading device 60 has a height H2 of, for example, 1.15 meters. That renders the height H5 of the daylighting system 10, which is a sum of the height H1 of the light-transmitting device 50 and the height H2 of the shading device 630, for example, equal to 1.8 meters.

The light-transmitting device 50 includes, for example, a window shade composed of multiple string-tied transparent slats (or a louver). "Slats (or a louver)" refers to a set of elongate plates.

Examples of such transparent slats include slats made of triacetyl cellulose (TAC) polyethylene terephthalate (PET) films, cycloolefin polymer (COP) films, polycarbonate (PC) films, polyethylene naphthalate (PEN) films, polyether sulfone (PES) films, polyimide (PI) films, and other like transparent films (base members).

The shading device 60 includes, for example, a window shade composed of multiple string-tied opaque slats (or a louver).

Examples of such opaque slats include: aluminum slats; and slats composed of an opaque film (base member) prepared by adding a pigment to triacetyl cellulose (TAC), polyethylene terephthalate (PET), cycloolefin polymer (COP), polycarbonate (PC), polyethylene naphthalate (PEN), polyether sulfone (PES), polyimide (PI), or another like transparent resin and molding the resultant substance into a predetermined shape.

The daylighting system 40 of the present embodiment is capable of blocking glaring direct light by means of the shading device 60 and allowing indoors only the light directed at the ceiling 1002a by the tight-transmitting device 50. In addition, since the daylighting system 10 of the present embodiment includes the tight-transmitting device 20 and the shading device 30, each of which in turn includes, for example, a window shade, the daylighting system 10 can be readily installed over the interior face 1001a of the window pane 1001. Similar effects can be achieved if the slats over an upper part of the window shade are removed. However, that wilt leave the strings with no slats over the upper part, and when the window shade is folded, the strings are inconveniently too tong to be retracted neatly. This potential problem renders use of transparent slats even more preferable.

Third Embodiment

Figure 3A:
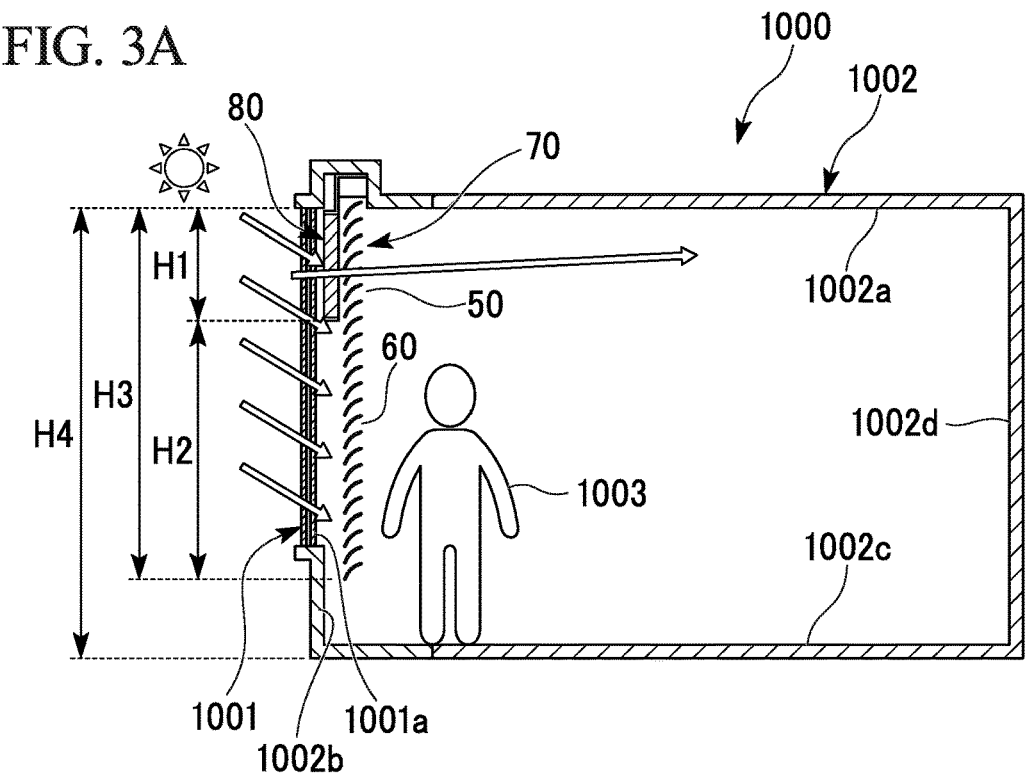
FIG. 3A is a schematic cross-sectional view of a configuration of a daylighting system in accordance with a third embodiment of the present invention.
Figure 3B:
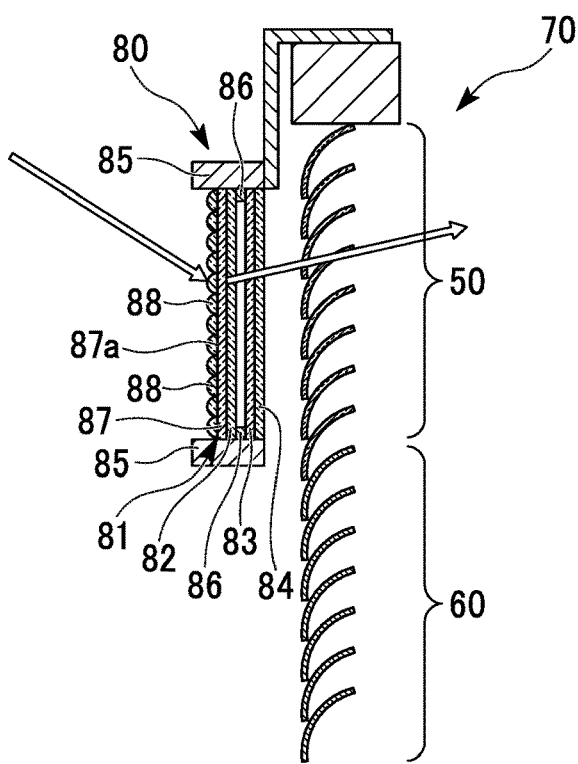
FIG. 3B is a schematic cross-sectional view of the configuration of the daylighting system in accordance with the third embodiment of the present invention, illustrating a part of FIG. 3A in a scaled-up manner.

FIGS. 3A and 3B are schematic cross-sectional views of a configuration of a daylighting system in accordance with a third embodiment of the present invention, FIG. 3B illustrating a part of FIG. 3A in a scaled-up manner. Those members shown in FIGS. 3A and 3B which are the same as those in the daylighting system of the first embodiment shown in FIGS. 1A and 1B or the daylighting system of the second embodiment shown in FIGS. 2A and 2B are indicated by the same reference signs or numerals, and description thereof is omitted.

A daylighting system 70 in accordance with the present embodiment includes: a light-transmitting device 50 disposed inside the room 1002 over an interior face (indoor face) 1001a of the window pane 1001 in such a manner as to face an upper part of the interior face 1001a of the window pane 1001 (near the ceiling 1002a); a shading device 60, joined to the light-transmitting device 50, over a lower part of the interior face 1001a of the window pane 1001 (near the floor 1002c); and a daylighting device 80 disposed over the light-transmitting device 50 closer to the interior face 1001a of the window pane 1001 than the tight-transmitting device 50 is close to the interior face 1001a.

In the daylighting system 70 of the present embodiment, the daylighting device 80 is disposed between the light-transmitting device 50 and the interior face 1001a of the window pane 1001.

The daylighting device 80, as shown in FIG. 3B, includes: a daylighting sheet 81; a first glass substrate (first substrate) 82 supporting the daylighting sheet 81; a light-diffusion sheet 83; a second glass substrate (second substrate) 84 supporting the light-diffusion sheet 83; and a frame (support member) 85 holding these elements. There are also provided spacers 86 between the first glass substrate 82 and the light-diffusion sheet 83.

The daylighting sheet 81 includes a transparent base member 87 and a plurality of transparent protrusion portions 88 disposed adjacent to each other on one of faces (i.e., a light-incident face, that is, an exterior face) 87a of the base member 87. Each protrusion portion 88 is disposed on the face 87a of the base member 87 in such a manner that the lengthwise direction of the protrusion portion 88 is perpendicular to the heightwise direction of the window pane 1001.

The daylighting system 70 of the present embodiment is capable of blocking glaring direct light by means of the shading device 60 and allowing indoors only the light directed at the ceiling 1002a by the tight-transmitting device 50. In addition, since the daylighting system 70 of the present embodiment includes the daylighting device 80 between the tight-transmitting device 50 and the interior face 1001a of the window pane 1001, the daylighting system 70 exhibits improved performance (daylighting capability) in guiding outdoor light into the room 1002. Additionally, since the daylighting system 70 of the present embodiment includes the light-transmitting device 20 and the shading device 30, each of which in turn includes, for example, a window shade, the daylighting system 70 can be readily installed over the interior face 1001a of the window pane 1001.

Note that the daylighting device 80 is disposed between the light-transmitting device 50 and the interior face 1001a of the window pane 1001 as an example in the present embodiment. This is however by no means limiting the present invention. Alternatively, in the present embodiment, the daylighting device 80 may be disposed over the light-transmitting device 50 on the far side of the light-transmitting device 50 from the interior face 1001a of the window pane 1001. Note also that the daylighting device 80 is by no means limited to the above-described structure and may be in the form of, for example, a lighting shell or louver that reflects sunlight to illuminate the interior.

Fourth Embodiment

Figure 4A:
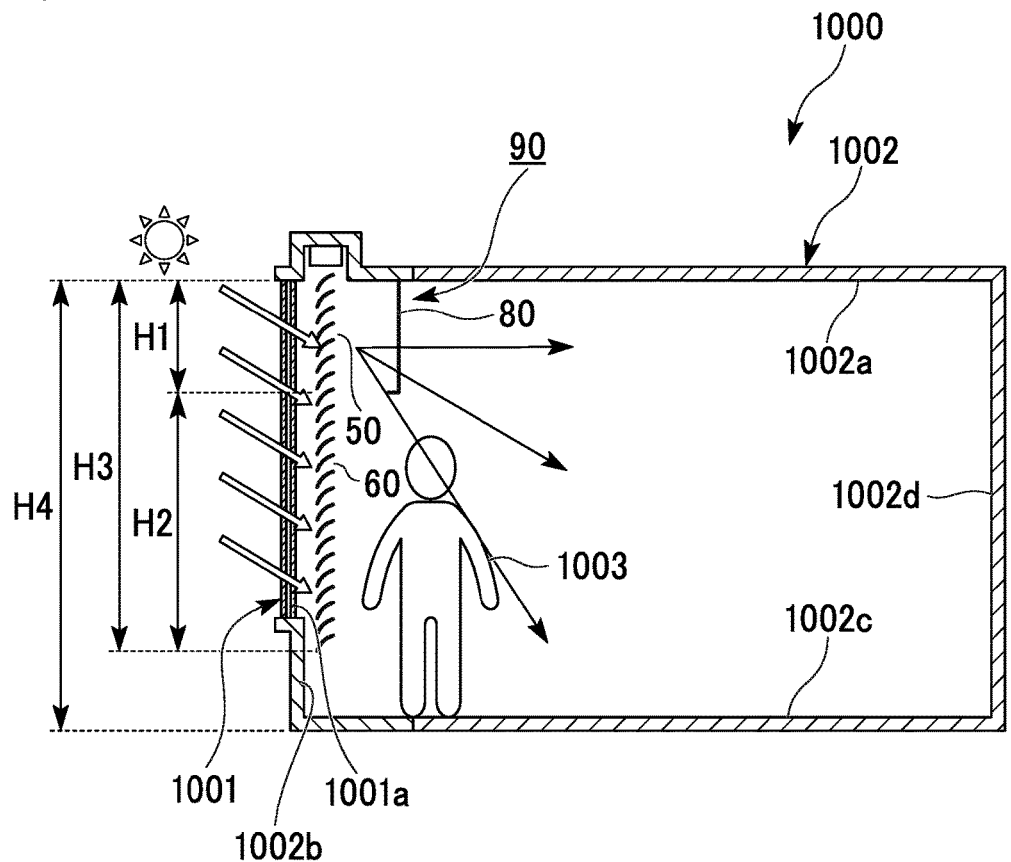
FIG. 4A is a schematic cross-sectional view of a configuration of a daylighting system in accordance with a fourth embodiment of the present invention.
Figure 4B:
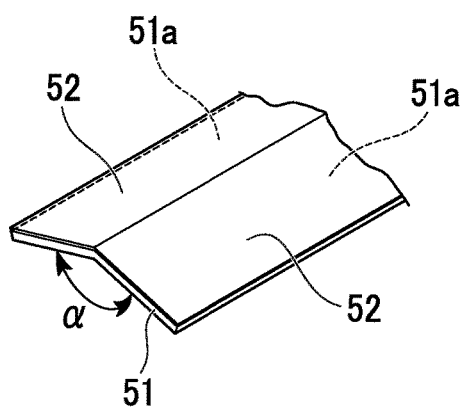
FIG. 4B is a schematic perspective view of the configuration of the daylighting system in accordance with the fourth embodiment of the present invention, illustrating a part of FIG. 4A in a scaled-up manner.

FIGS. 4A and 4B are a schematic cross-sectional view and a schematic perspective view, respectively, of a configuration of a daylighting system in accordance with a fourth embodiment of the present invention, FIG. 4B illustrating a part of FIG. 4A in a scaled-up manner. Those members shown in FIGS. 4A and 4B which are the same as those in the daylighting system of the first embodiment shown in FIGS. 1A and 1B, the daylighting system of the second embodiment shown in FIGS. 2A and 2B, or the daylighting system of the third embodiment shown in 3A and 3B are indicated by the same reference signs or numerals, and description thereof is omitted.

A daylighting system 90 in accordance with the present embodiment includes: a light-transmitting device 50 disposed inside the room 1002 over an interior face (indoor face) 1001a of the window pane 1001 in such a manner as to face an upper part of the interior face 1001a of the window pane 1001 (near the ceiling 1002a); a shading device 60, joined to the light-transmitting device 50, over a lower part of the interior face 1001a of the window pane 1001 (near the floor 1002c); and a daylighting device 80 disposed over the light-transmitting device 50 on the far side of the light-transmitting device 50 from the interior face 1001a of the window pane 1001.

As shown in FIG. 4B, the light-transmitting device 50 includes multiple transparent slats 51 each of which has a V-like shape in the cross-section thereof taken perpendicular to the lengthwise direction thereof. The V-like shape has an apex angle α of, for example, 150°. The multiple slats 51 are tied together with strings so that the apex angles α point at the ceiling 1002a of the room model 1000. The apex angles α are adjusted as appropriate in accordance with the traveling direction of the tight to be guided into the room 1002.

Each slat 51 is disposed so that a face 51a thereof faces toward the ceiling 1002a of the room 1002. The face 51a has thereon a scattering plate 52 for scattering light. The scattering plate 52 may be, for example, a white scattering plate made of white PET resin.

The daylighting system 90 of the present embodiment is capable of blocking glaring direct light by means of the shading device 60. In addition, the daylighting system 90 of the present embodiment includes the scattering plates 52 for scattering light on the faces 51a of the multiple transparent slats 51 constituting the light-transmitting device 50, the faces 51a facing toward the ceiling 1002a of the room 1002. Therefore, the incident light having transmitted through the window pane 1001 is diffused by the scattering plates 52, thereby illuminating across the whole room 1002. Additionally, since the daylighting system 90 of the present embodiment includes the light-transmitting device 50 and the shading device 60, each of which in turn includes, for example, a window shade, the daylighting system 90 can be readily installed over the interior face 1001a of the window pane 1001.

Fifth Embodiment

Figure 5A:
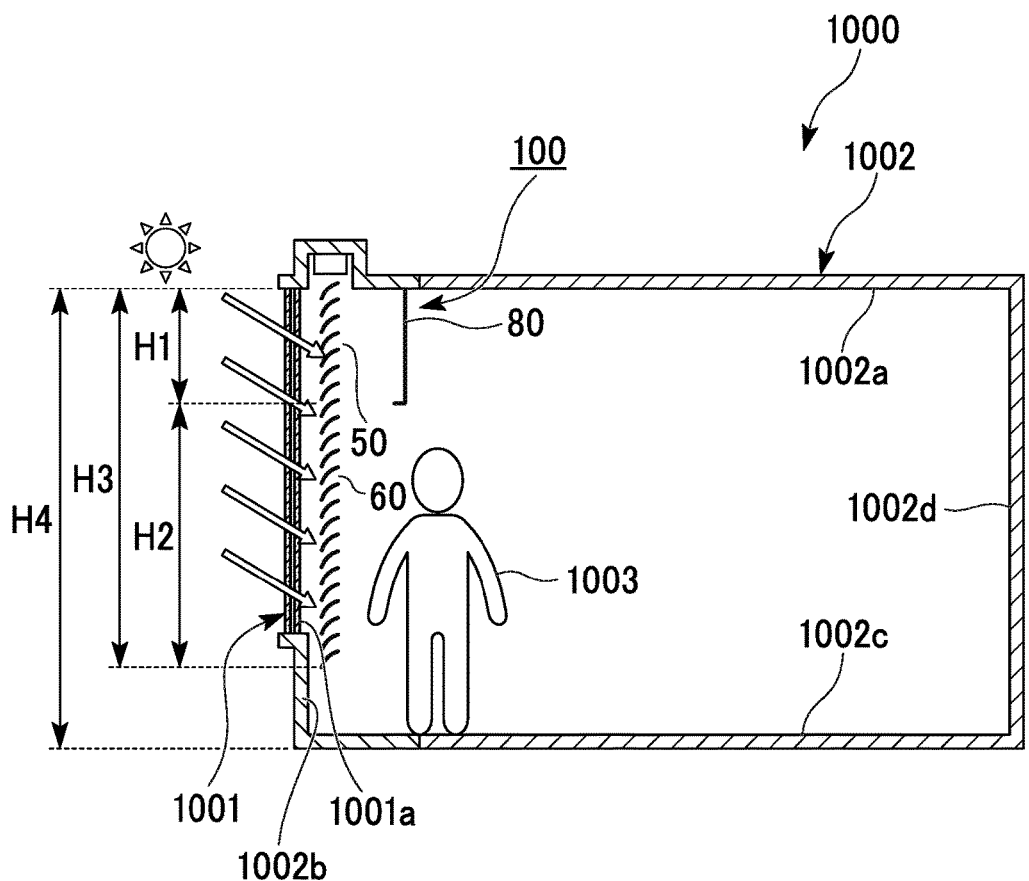
FIG. 5A is a schematic cross-sectional view of a configuration of a daylighting system in accordance with a fifth embodiment of the present invention.
Figure 5B:
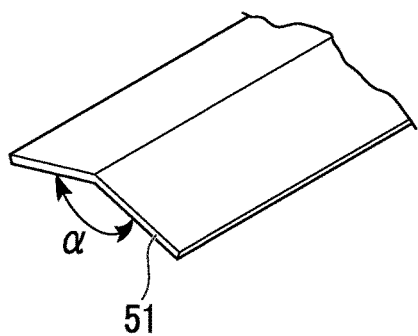
FIG. 5B is a schematic perspective view of the configuration of the daylighting system in accordance with the fifth embodiment of the present invention, illustrating a part of FIG. 5A in a scaled-up manner.

FIGS. 5A and 5B are a schematic cross-sectional view and a schematic perspective view, respectively, of a configuration of a daylighting system in accordance with a fifth embodiment of the present invention, FIG. 5B illustrating a part of FIG. 5A in a scaled-up manner. Those members shown in FIGS. 5A and 5B which are the same as those in the daylighting system of the first embodiment shown in FIGS. 1A and 1B, the daylighting system of the second embodiment shown in FIGS. 2A and 2B, the daylighting system of the third embodiment shown in FIGS. 3A and 3B, or the daylighting system of the fourth embodiment shown in FIGS. 4A and 4B are indicated by the same reference signs or numerals, and description thereof is omitted.

A daylighting system 100 in accordance with the present embodiment includes: a light-transmitting device 50 disposed inside the room 1002 over an interior face (indoor face) 1001a of the window pane 1001 in such a manner as to face an upper part of the interior face 1001a of the window pane 1001 (near the ceiling 1002a); a shading device 60, joined to the light-transmitting device 50, over a lower part of the interior face 1001a of the window pane 1001 (near the floor 1002c); and a daylighting device 80 disposed over the tight-transmitting device 50 on the far side of the light-transmitting device 50 from the interior face 1001a of the window pane 1001.

The daylighting system 100 of the present embodiment includes slats 51 each of which is, for example, a film containing uniformly distributed transparent particles shown) therein to scatter or transmit light.

The daylighting system 100 of the present embodiment is capable of blocking glaring direct light by means of the shading device 60. In addition, the daylighting system 100 of the present embodiment includes uniformly distributed transparent particles for scattering or transmitting light in the multiple transparent slats 51 constituting the light-transmitting device 50. Therefore, the incident light having transmitted through the window pane 1001 is diffused by the transparent particles, thereby illuminating across the whole room 1002. Additionally, since the daylighting system 100 of the present embodiment includes the light-transmitting device 50 and the shading device 60, each of Which in turn includes, for example, a window shade, the daylighting system 100 can be readily installed over the interior face 1001a of the window pane 1001.

Sixth Embodiment

Figure 6A:
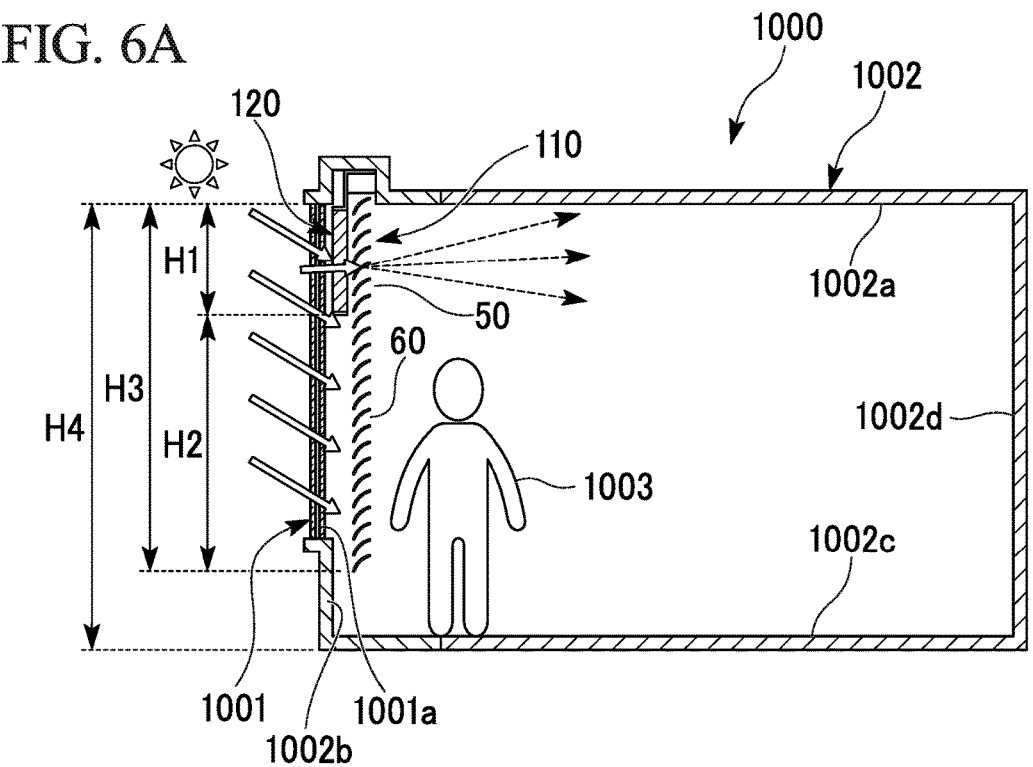
FIG. 6A is a schematic cross-sectional view of a configuration of a daylighting system in accordance with a sixth embodiment of the present invention.
Figure 6B:
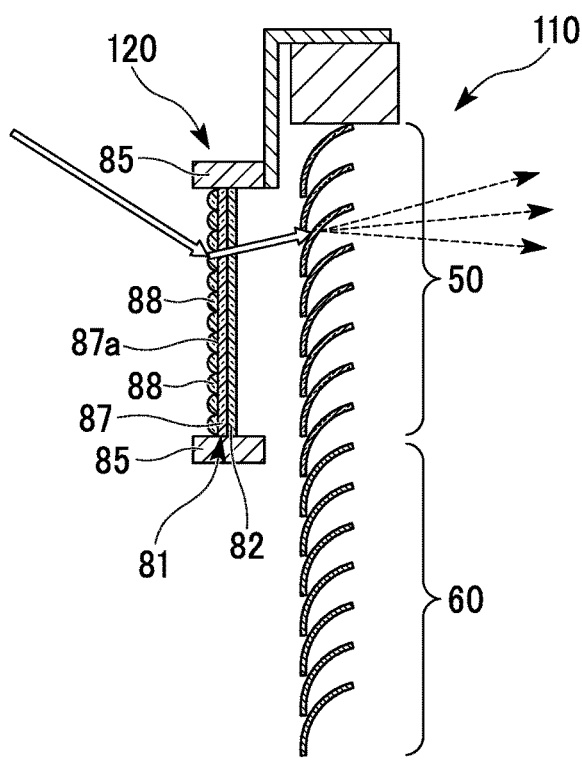
FIG. 6B is a schematic cross-sectional view of the configuration of the daylighting system in accordance with the sixth embodiment of the present invention, illustrating a part of FIG. 6A in a scaled-up manner.
Figure 7A:
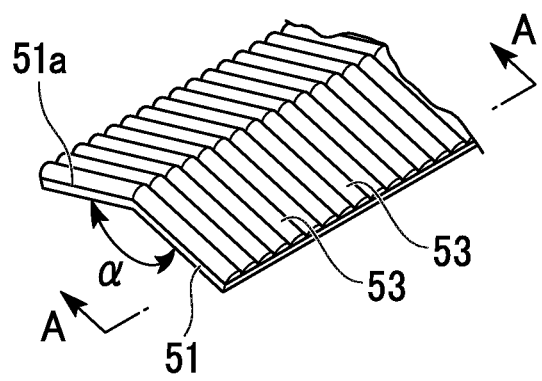
FIG. 7A is a schematic perspective view of the configuration of the daylighting system in accordance with the sixth embodiment of the present invention, illustrating a part of FIG. 6A in a scaled-up manner.
Figure 7B:
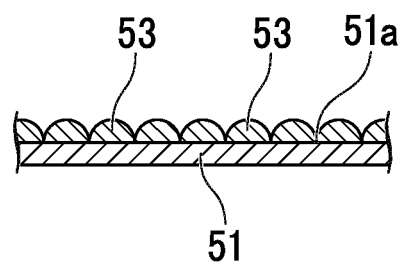
FIG. 7B is a schematic cross-sectional view, taken along line A-A in FIG. 7A, of the configuration of the daylighting system in accordance with the sixth embodiment of the present invention.

FIGS. 6A and 6B are schematic cross-sectional views of a configuration of a daylighting system in accordance with a sixth embodiment of the present invention, FIG. 6B illustrating a part of FIG. 6A in a scaled-up manner. FIGS. 7A and 7B are a schematic perspective view and a schematic cross-sectional view, respectively, of the configuration of the daylighting system in accordance with the sixth embodiment of the present invention, FIG. 7A illustrating a part of FIG. 6A in a scaled-up manner and FIG. 7B being taken along line A-A in FIG. 7A. Those members shown in FIGS. 6A, 6B, 7A, and 7B which are the same as those in the daylighting system of the first embodiment shown in FIGS. 1A and 1B, the daylighting system of the second embodiment shown in FIGS. 2A and 2B, the daylighting system of the third embodiment shown in FIGS. 3A and 3B, or the daylighting system of the fourth embodiment shown in FIGS. 4A and 4B are indicated by the same reference signs or numerals, and description thereof is omitted.

A daylighting system 110 in accordance with the present embodiment includes: a light-transmitting device 50 disposed inside the room 1002 over an interior face (indoor face) 1001a of the window pane 1001 in such a manner as to face an upper part of the interior face 1001a of the window pane 1001 (near the ceiling 1002a); a shading device 60, joined to the light-transmitting device 50, over a lower part of the interior face 1001a of the window pane 1001 (near the floor 1002c); and a daylighting device 120 disposed over the tight-transmitting device 50 closer to the interior face 1001a of the window pane 1001 than the light-transmitting device 50 is close to the interior face 1001a.

In the daylighting system 110 of the present embodiment, the daylighting device 120 is disposed between the light-transmitting device 50 and the interior face 1001a of the window pane 1001.

The daylighting device 120, as shown in FIG. 6B, includes: a daylighting sheet 81; a first glass substrate (first substrate) 82 supporting the daylighting sheet 81; and a frame (support member) 85 holding these elements.

The daylighting sheet 81 includes a transparent base member 87 and a plurality of transparent protrusion portions 88 disposed adjacent to each other on one of faces (i.e., a light-incident face, that is, an exterior face) 87a of the base member 87. Each protrusion portion 88 is disposed on that one of faces of the base member 87 in such a manner that the lengthwise direction of the protrusion portion 88 is perpendicular to the heightwise direction of the window pane 1001.

As shown in FIGS. 7A and 7B, the light-transmitting device 50 includes multiple transparent slats 51 each of which has a V-like shape in the cross-section thereof taken perpendicular to the lengthwise direction thereof. The V-like shape has an apex angle α of, for example, 150°. The multiple slats 51 are tied together with strings so that the apex angles α point at the ceiling 1002a of the room model 1000. The apex angles α are adjusted as appropriate in accordance with the traveling direction of the tight to be guided into the room 1002.

Each slat 51 is disposed so that a face 51a thereof faces toward the ceiling 1002a of the room model 1000. The face 51a has thereon a plurality of transparent protrusion portions 53 arranged mutually adjacent in the lengthwise direction of the slat 51. Each protrusion portion 53 has a cross-section that, when taken perpendicular to the length thereof, has a semicircular shape that bulges away from the face 51a. The protrusion portion 53 is provided on the face 51a so that the length thereof is perpendicular to the length of the slat 51. The protrusion portion 53 is anisotropic with respect to light-diffusion direction in such a manner that the protrusion portion 53 is highly diffusive in horizontal directions.

The daylighting system 110 of the present embodiment is capable of blocking glaring direct light by means of the shading device 60. In addition, the daylighting system 110 of the present embodiment includes the transparent protrusion portions 53 arranged mutually adjacent in the lengthwise direction of the multiple transparent slats 51 on the faces 51a of the slats 51 constituting the light-transmitting device 50, the faces 51a facing toward the ceiling 1002a of the room model 1000. Therefore, the incident light having transmitted through the window pane 1001 is highly diffused in horizontal directions by the protrusion portions 53 before being guided into the room 1002. Additionally, the slats 51 have the protrusion portions 53 in the daylighting system 110 of the present embodiment. Therefore, unlike the third embodiment described above, no light-diffusion sheet is needed. Hence, the daylighting system 110 has a reduced weight and can be readily installed over the interior face 1001a of the window pane 1001. In the present embodiment, anisotropic diffusion capability is created by providing the protrusion portions 53 on the faces 51a of the slats 51. This is however not the only way to create anisotropic diffusion capability. Alternatively, anisotropic diffusion capability may be created by, for example, attaching an anisotropic diffusion film to the faces 51a of the slats 51.

Seventh Embodiment

Figure 8A:
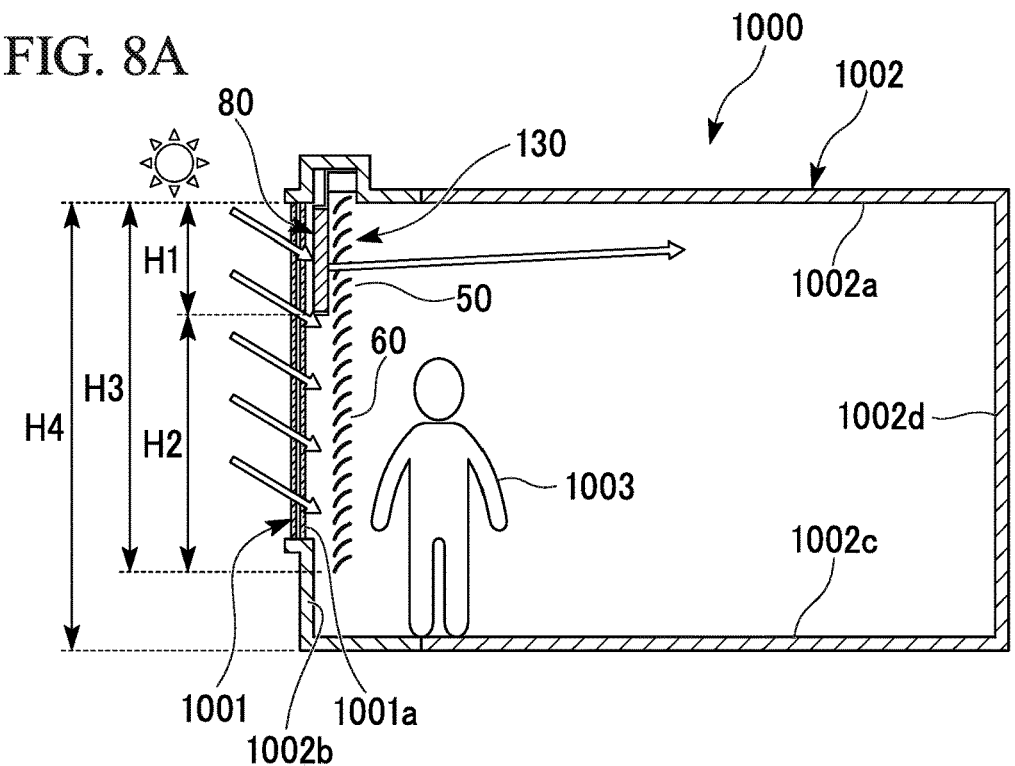
FIG. 8A is a schematic cross-sectional view of a configuration of a daylighting system in accordance with a seventh embodiment of the present invention.
Figure 8B:
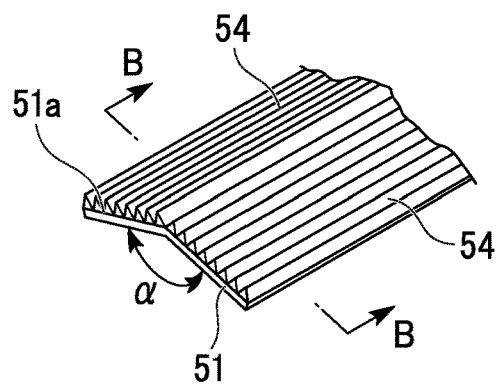
FIG. 8B is a schematic perspective view of the configuration of the daylighting system in accordance with the seventh embodiment of the present invention, illustrating a part of FIG. 8A in a scaled-up manner.
Figure 8C:
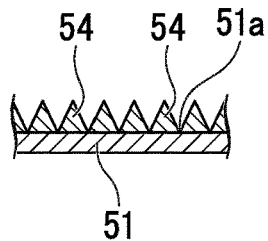
FIG. 8C is a schematic cross-sectional view, taken along line B-B in FIG. 8B, of the configuration of the daylighting system in accordance with the seventh embodiment of the present invention.

FIGS. 8A to 8C are a schematic cross-sectional view, a schematic perspective view, and a schematic cross-sectional view, respectively, of a configuration of a daylighting system in accordance with a seventh embodiment of the present invention, FIG. 8B illustrating a part of FIG. 8A in a scaled-up manner and FIG. 8C being taken along line B-B in FIG. 8B. Those members shown in 8A to 8C which are the same as those in the daylighting system of the first embodiment shown in FIGS. 1A and 1B, the daylighting system of the second embodiment shown in FIGS. 2A and 2B, the daylighting system of the third embodiment shown in FIGS. 3A and 3B, or the daylighting system of the fourth embodiment shown in FIGS. 4A and 4B are indicated by the same reference signs or numerals, and description thereof is omitted.

A daylighting system 130 in accordance with the present embodiment includes: a light-transmitting device 50 disposed inside the room 1002 over an internal face 1001a of the window pane 1001 in such a manner as to face an upper part of the interior face 1001a of the window pane 1001 (near the ceiling 1002a); a shading device 60, joined to the light-transmitting device 50, over a lower part of the interior face 1001a of the window pane 1001 (near the floor 1002c); and a daylighting device 80 disposed over the light-transmitting device 50 closer to the interior face 1001a of the window pane 1001 than the light-transmitting device 50 is close to the interior thee 1001a.

In the daylighting system 130 of the present embodiment, the daylighting device 80 is disposed between the light-transmitting device 50 and the interior face 1001a of the window pane 1001.

The light-transmitting device 50, as shown in FIGS. 8B and 8C, includes multiple transparent slats 51 each of which has a V-like shape in the cross-section thereof taken perpendicular to the lengthwise direction thereof. The V-like shape has an apex angle α of, for example, 150°. The multiple slats 51 are tied together with strings so that the apex angles α point at the ceiling 1002a of the room model 1000. The apex angles α are adjusted as appropriate in accordance with the traveling direction of the light to be guided into the room 1002.

Each slat 51 is disposed so that a face 51a thereof faces toward the ceiling 1002a of the room 1002. The face 51a has thereon a plurality of transparent prisms 54 arranged mutually adjacent in the lengthwise direction of the slat 51. Each prism 54 has a cross-section that, when taken perpendicular to the length thereof, has a triangular shape that bulges away from the face 51a. The prism 54 is provided on the face 51a so that the length thereof is parallel to the length of the slat 51.

These prisms 54 change the traveling direction of the light incident thereto closer to the heightwise H4 direction of the room 1002 (the vertical direction).

The daylighting system 130 of the present embodiment is capable of blocking glaring direct light by means of the shading device 60.

In addition, the daylighting system 130 of the present embodiment is capable of further changing the traveling direction of incoming light that has been changed by the daylighting device 80 toward the ceiling 1002a.

The daylighting system 130 of the present embodiment is capable of fine-tuning the traveling direction of incoming light in accordance with times and seasons by adjusting the shape of the prisms 54 and the angle of the slats 51 and still using the same daylighting device 80.

The prisms 54 in the daylighting system 130 of the present embodiment may have two or more types of structures in accordance with distance from the ceiling 1002a. As an example, the prisms 54 on those slats 51 which constitute a part of the light-transmitting device 50 that is close to the ceiling 1002a have a structure that bends incident light so as to travel in horizontal directions, whereas on those slats 51 which constitute a part of the light-transmitting device 50 that is far from the ceiling 1002a, the prisms 54 have a structure that bends incident light so as to travel toward the ceiling 1002a. This configuration of the prisms 54 with two or more types of structures in accordance with distance from the ceiling 1002a makes it possible to modify the direction to which incident light is bent in accordance with the location (height) of the slats 51. In this manner, the daylighting system 130 of the present embodiment is capable of adjusting daylighting capability in accordance with usage and still using the same daylighting device 80.

Additionally, since the daylighting system 130 of the present embodiment includes the light-transmitting device 50 and the shading device 60, each of which in turn includes, for example, a window shade, the daylighting system 130 can be readily installed over the interior face 1001a of the window pane 1001.

Eighth Embodiment

Figure 9:
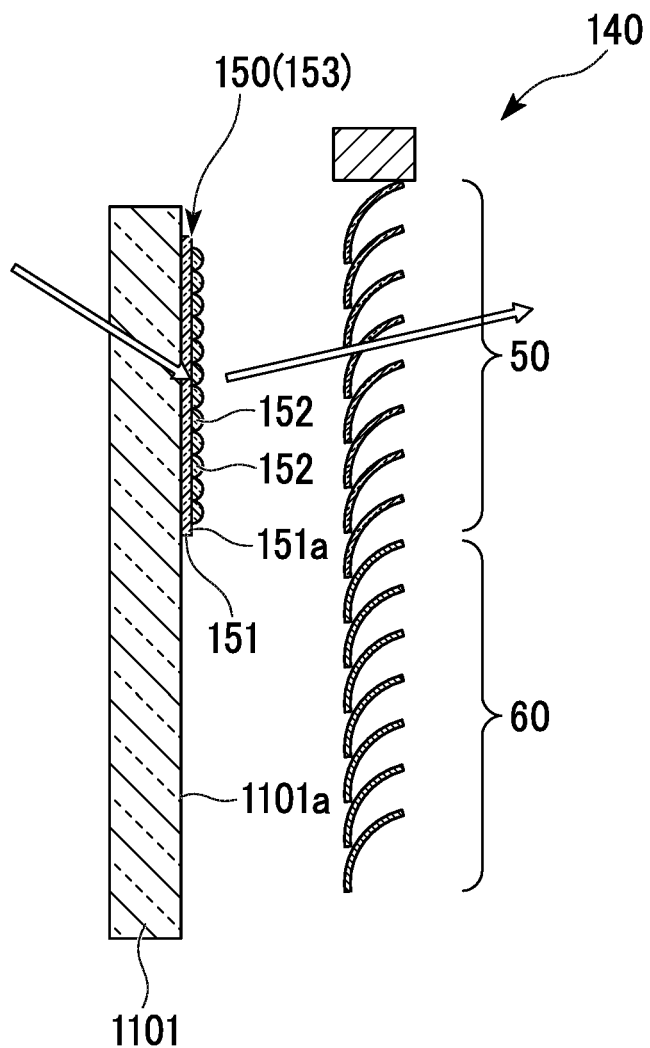
FIG. 9 is a schematic cross-sectional view of a configuration of a daylighting system in accordance with an eighth embodiment of the present invention.

FIG. 9 is a schematic cross-sectional view of a configuration of a daylighting system in accordance with an eighth embodiment of the present invention. Those members shown in FIG. 9 which are the same as those in the daylighting system of the first embodiment shown in FIGS. 1A and 1B are indicated by the same reference signs or numerals, and description thereof is omitted.

A daylighting system 140 in accordance with the present embodiment includes: a light-transmitting device 50 disposed inside a room over an interior face 1001a of the window pane 1001 in such a manner as to face an upper part of the interior face 1001a of the window pane 1001 (near the ceiling); a shading device 60, joined to the light-transmitting device 50, over a lower part of the interior face 1001a of the window pane 1001 (near the floor); and a daylighting device 150 disposed over the light-transmitting device 50 closer to the interior face 1001a of the window pane 1001 than the light-transmitting device 50 is close to the interior face 1001a.

In the daylighting system 140 of the present embodiment, the daylighting device 150 is installed on the interior face 1001a of the window pane 1001.

The daylighting device 150 is composed of a daylighting sheet 153 including: a transparent base member 151; and a plurality of transparent protrusion portions 152 disposed adjacent to each other on one of faces 151a of the base member 151.

Each protrusion portion 152 is disposed on the face 151a of the base member 151 in such a manner that the lengthwise direction of the protrusion portion 152 is perpendicular to the heightwise direction of the window pane 1001.

The daylighting system 140 of the present embodiment is capable of blocking glaring direct light by means of the shading device 60 and allowing indoors only the light directed at the ceiling 1002a by the light-transmitting device 50. In addition, since the daylighting system 140 of the present embodiment includes the daylighting device 150 on the interior face 1001a of the window pane 1001, the daylighting system 140 has a simplified configuration and can be readily installed over the interior face 1001a of the window pane 1001.

Ninth Embodiment

Figure 10:
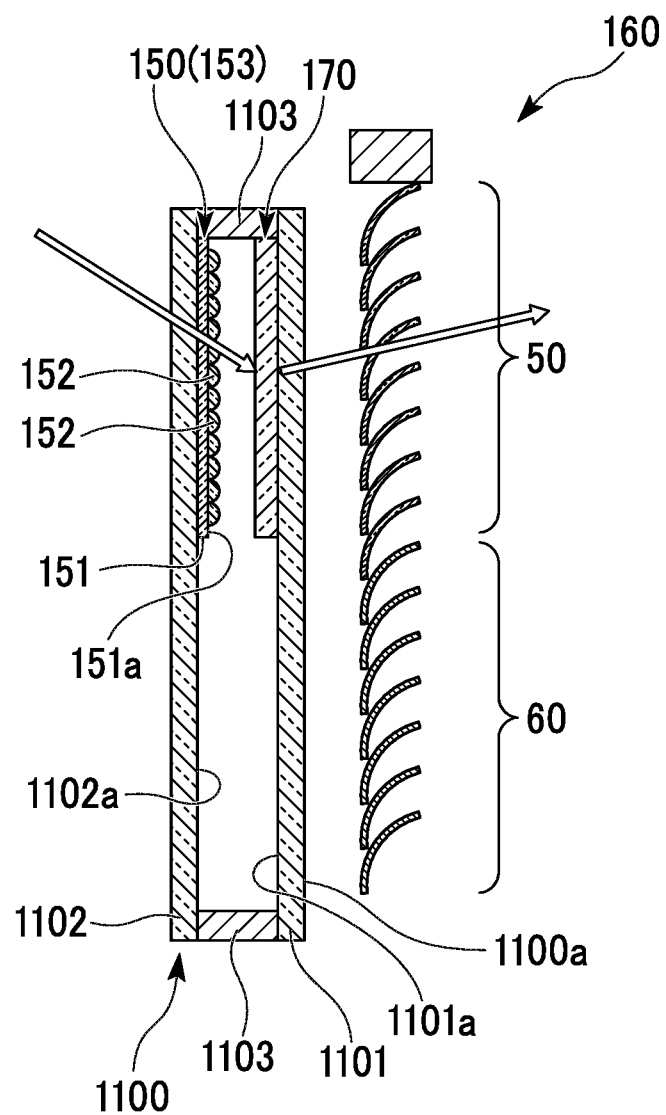
FIG. 10 is a schematic cross-sectional view of a configuration of a daylighting system in accordance with a ninth embodiment of the present invention.

FIG. 10 is a schematic cross-sectional view of a configuration of a daylighting system in accordance with a ninth embodiment of the present invention. Those members shown in FIG. 10 which are the same as those in the daylighting system of the first embodiment shown in FIGS. 1A and 1B or the daylighting system of the eighth embodiment shown in FIG. 9 are indicated by the same reference signs or numerals, and description thereof is omitted.

A daylighting system 160 in accordance with the present embodiment includes: a light-transmitting device 50 disposed inside a room over an interior face 1100a of a window pane 1100 in such a manner as to face an upper part of the interior face 1100a of the window pane 1100 (near the ceiling); a shading device 60, joined to the light-transmitting device 50, over a lower part of the interior face 1100a of the window pane 1100 (near the floor); a daylighting device 150 disposed to face the light-transmitting device 50; and a light-diffusion device 170 composed of a light-diffusion sheet and disposed over the daylighting device 150.

In the present embodiment, the window pane 1100 is multilayered glass including a pair of glass plates 1101 and 1102 face to face at a distance via spacers 1103. Throughout the following description, the glass plate 1101, disposed on the indoor side, will be referred to as the first glass plate 1101, and the glass plate 1102, disposed on the outdoor side, will be referred to as the second glass plate 1102.

In the daylighting system 160 of the present embodiment, the daylighting device 150 is provided inside the window pane 1100, that is, between the first glass plate 1101 and the second glass plate 1102. More particularly, the daylighting device 150 is provided on a face 1102a of the second glass plate 1102 that faces the first glass plate 1101.

In addition, the light-diffusion device 170 is provided inside the window pane 1100, that is, between the first glass plate 1101 and the second glass plate 1102. More particularly, the light-diffusion device 170 is provided on a face 1101a of the first glass plate 1101 that faces the second glass plate 1102.

The daylighting system 160 of the present embodiment is capable of blocking glaring direct light by means of the shading device 60 and allowing indoors only the light directed at the ceiling 1002a by the tight-transmitting device 50. In addition, since the daylighting system 160 of the present embodiment includes the daylighting device 150 and the light-diffusion device 170 inside the window pane 1100 that is composed of multilayered glass, the daylighting system 160 has a simplified configuration and can be readily installed over the interior face 1001a of the window pane 1001.

Tenth Embodiment

Figure 11:
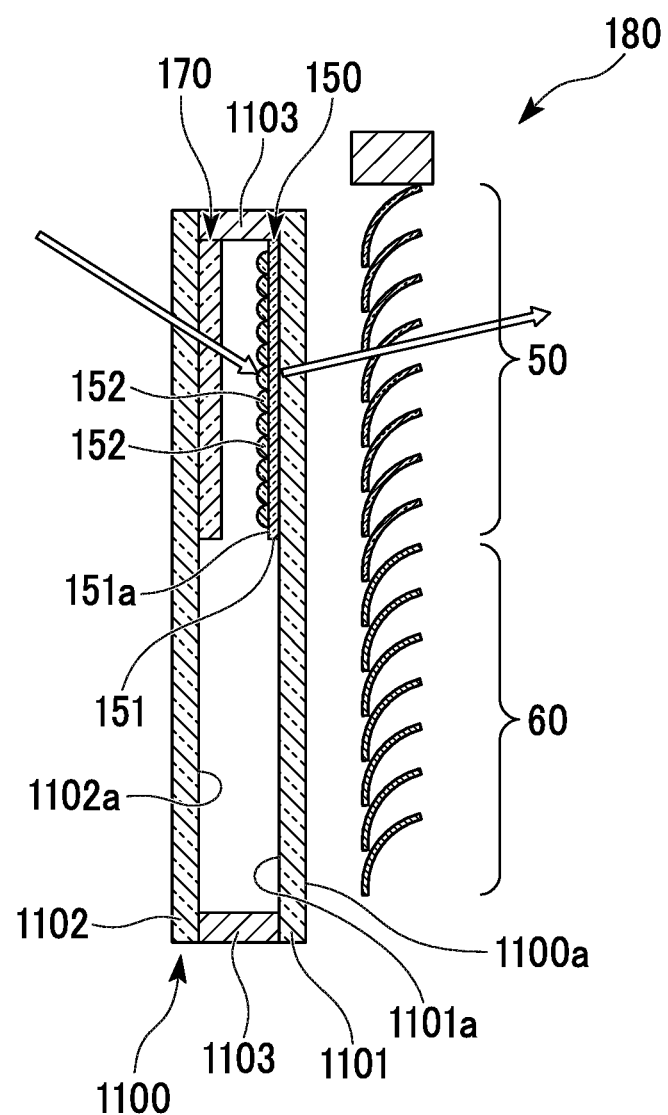
FIG. 11 is a schematic cross-sectional view of a configuration of a daylighting system in accordance with a tenth embodiment of the present invention.

FIG. 11 is a schematic cross-sectional view of a configuration of a daylighting system in accordance with a tenth embodiment of the present invention. Those members shown in FIG. 11 which are the same as those in the daylighting system of the first embodiment shown in FIGS. 1A and 1B, the daylighting system of the eighth embodiment shown in FIG. 9, or the daylighting system of the ninth embodiment shown in FIG. 10 are indicated by the same reference signs or numerals, and description thereof is omitted. A daylighting system 180 in accordance with the present embodiment includes: a light-transmitting device 50 disposed inside a room over an interior face 1100a of a window pane 1100 in such a manner as to face an upper part of the interior face 1100a of the window pane 1100 (near the ceiling); a shading device 60, joined to the light-transmitting device 50, over a lower part of the interior face 1100a of the window pane 1100 (near the floor); a daylighting device 150 disposed to face the light-transmitting device 50; and a light-diffusion device 170 composed of a light-diffusion sheet and disposed over the daylighting device 150.

In the daylighting system 180 of the present embodiment, the daylighting device 150 is provided inside the window pane 1100, that is, between the first glass plate 1101 and the second glass plate 1102. More particularly, the daylighting device 150 is provided on a face 1101a of the first glass plate 1101 that faces the second glass plate 1102.

In addition, the light-diffusion device 170 is provided inside the window pane 1100, that is, between the first glass plate 1101 and the second glass plate 1102. More particularly, the light-diffusion device 170 is provided on a face 1102a of the second glass plate 1102 that faces the first glass plate 1101.

The daylighting system 180 of the present embodiment is capable of blocking glaring direct light by means of the shading device 60 and allowing indoors only the light directed at the ceiling 1002a by the light-transmitting device 50. In addition, since the daylighting system 180 of the present embodiment includes the daylighting device 150 and the light-diffusion device 170 inside the window pane 1100 that is composed of multilayered glass, the daylighting system 180 has a simplified configuration and can be readily installed over the interior face 1001a of the window pane 1001.

Eleventh Embodiment

Figure 12:
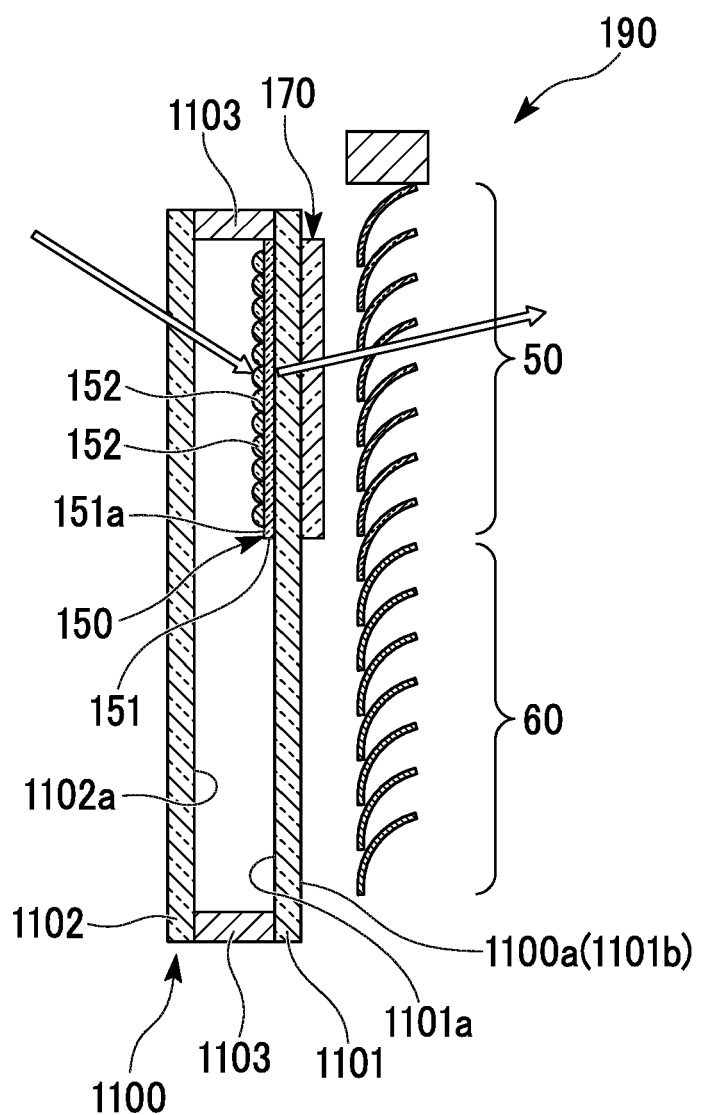
FIG. 12 is a schematic cross-sectional view of a configuration of a daylighting system in accordance with an eleventh embodiment of the present invention.

FIG. 12 is a schematic cross-sectional view of a configuration of a daylighting system in accordance with an eleventh embodiment of the present invention. Those members shown in FIG. 12 which are the same as those in the daylighting system of the first embodiment shown in FIGS. 1A and 1B, the daylighting system of the eighth embodiment shown in FIG. 9, or the daylighting system of the ninth embodiment shown in FIG. 10 are indicated by the same reference signs or numerals, and description thereof is omitted.

A daylighting system 190 in accordance with the present embodiment includes: a light-transmitting device 50 disposed inside a room over an interior face 1100a of the window pane 1100 in such a manner as to face an upper part of the interior face 1100a of the window pane 1100 (near the ceiling); a shading device 60, joined to the light-transmitting device 50, over a lower part of the interior face 1100a of the window pane 1100 (near the floor); a daylighting device 150 disposed to face the light-transmitting device 50; and a light-diffusion device 170 composed of a tight-diffusion sheet and disposed over the daylighting device 150.

In the daylighting system 190 of the present embodiment, the daylighting device 150 is provided inside the window pane 1100, that is, between the first glass plate 1101 and the second glass plate 1102. More particularly, the daylighting device 150 is provided on a face 1101a of the first glass plate 1101 that faces the second glass plate 1102. In addition, the light-diffusion device 170 is provided on a face 1101b of the first glass plate 1101 opposite the face 1101a of the first glass plate 1101 that faces the second glass plate 1102.

The daylighting system 190 of the present embodiment is capable of blocking glaring direct tight by means of the shading device 60 and allowing indoors only the light directed at the ceiling 1002a by the light-transmitting device 50. In addition, since the daylighting system 190 of the present embodiment includes; the daylighting device 150 on the face 1101a of the first glass plate 1101 facing the second glass plate 1102; and the light-diffusion device 170 on the face 1101b of the first glass plate 1101 opposite the face 1101a of the first glass plate 1101 facing the second glass plate 1102, the daylighting system 190 has a simplified configuration and can be readily installed over the interior face 1001a of the window pane 1001.

Twelfth Embodiment

Figure 13A:
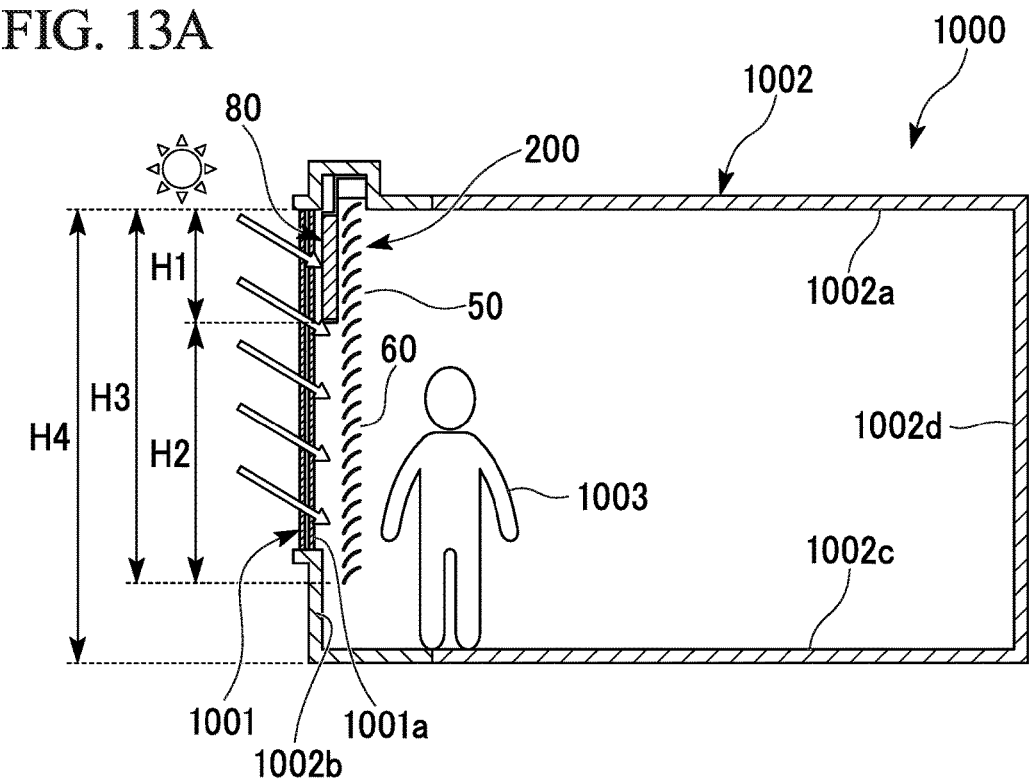
FIG. 13A is a schematic cross-sectional view of a configuration of a daylighting system in accordance with a twelfth embodiment of the present invention.
Figure 13B:
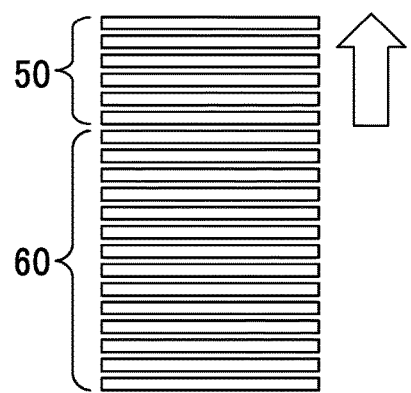
FIG. 13B is a first schematic front view of the configuration of the daylighting system in accordance with the twelfth embodiment of the present invention.
Figure 13C:
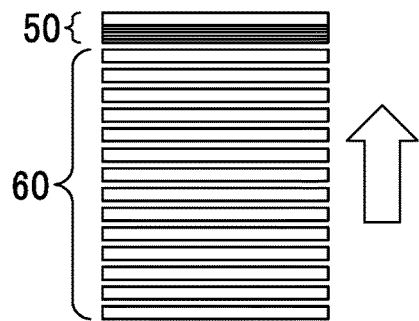
FIG. 13C is a second schematic front view of the configuration of the daylighting system in accordance with the twelfth embodiment of the present invention.
Figure 13D:
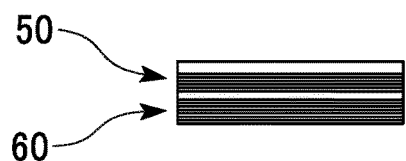
FIG. 13D is a third schematic front view of the configuration of the daylighting system in accordance with the twelfth embodiment of the present invention.

FIG. 13A is a schematic cross-sectional view of a configuration of a daylighting system in accordance with a twelfth embodiment of the present invention, FIGS. 13B to 13D are schematic front views of the configuration of the daylighting system in accordance with the twelfth embodiment of the present invention. Those members shown in FIGS. 13A to 13D which are the same as those in the daylighting system of the first embodiment shown in FIGS. 1A and 1B, the daylighting system of the second embodiment shown in FIGS. 2A and 2B, or the daylighting system of the third embodiment shown in FIGS. 3A and 3B are indicated by the same reference signs or numerals, and description thereof is omitted.

A daylighting system 200 in accordance with the present embodiment includes: a light-transmitting device 50 disposed inside the room 1002 over an interior face (indoor face) 1001a of the window pane 1001 in such a manner as to face an upper part of the interior face 1001a of the window pane 1001 (near the ceiling 1002a); a shading device 60, joined to the light-transmitting device 50, over a lower part of the interior face 1001a of the window pane 1001 (near the floor 1002c); and a daylighting device 80 disposed over the light-transmitting device 50 closer to the interior face 1001a of the window pane 1001 than the light-transmitting device 50 is close to the interior face 1001a.

In the daylighting system 200 of the present embodiment, the light-transmitting device 50 and the shading device 60 can be independently moved up/down over the interior face 1001a of the window pane 1001. The light-transmitting device 50 and the shading device 60 can be moved up/down using, for example, individual strings. In addition, since the light-transmitting device 50 and the shading device 60 are operable using, for example, individual strings, the slats are structured so that they can also be independently opened/closed (not shown in FIGS. 13A to 13D).

In the daylighting system 200 of the present embodiment, the light-transmitting device 50 is opened as shown in FIG. 13B to allow light into the room 1002. To completely block light from entering the room 1002, as shown in FIG. 13C, the light-transmitting device 50 is closed by, for example, being wound upwards, so that the shading device 60 can cover the entire interior face 1001a of the window pane 1001, Note that the shading device 60 has such dimensions that the shading device 60 can cover the entire interior face 1001a of the window pane 1001 with the light-transmitting device 50 closed. In addition, the interior face 1001a of the window pane 1001 is not at all covered by the daylighting system 200 as shown in FIG. 13D if the light-transmitting device 50 is closed by, for example, being wound upwards and the shading device 60 is closed by; for example, being wound upwards.

Thirteenth Embodiment

Figure 14A:
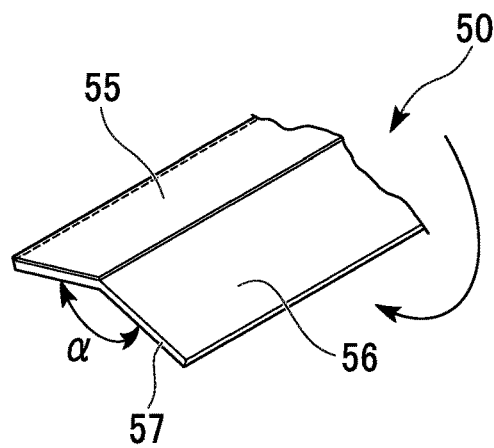
FIG. 14A is a schematic perspective view of a configuration of a daylighting system in accordance with a thirteenth embodiment of the present invention.
Figure 14B:
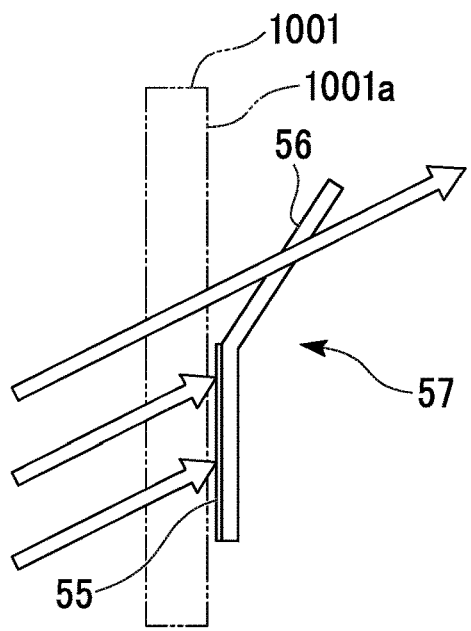
FIG. 14B is a schematic cross-sectional view of the configuration of the daylighting system in accordance with the thirteenth embodiment of the present invention.
Figure 14C:
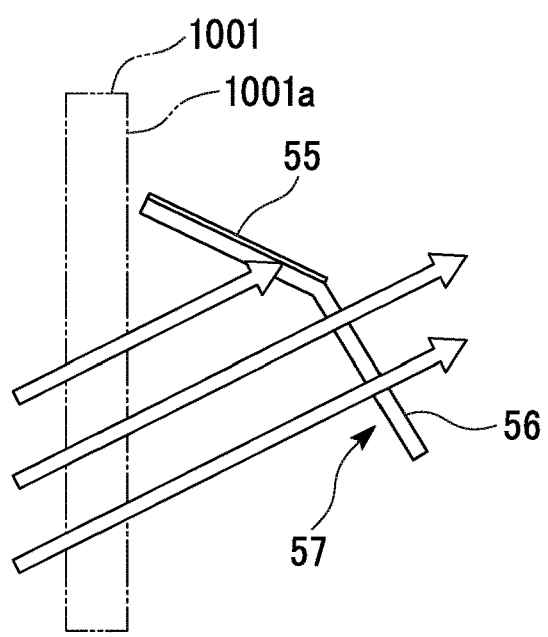
FIG. 14C is a schematic cross-sectional view of the configuration of the daylighting system in accordance with the thirteenth embodiment of the present invention.

FIGS. 14A to 14C are a schematic perspective view, a schematic cross-sectional view, and another schematic cross-sectional view, respectively, of a configuration of a daylighting system in accordance with a thirteenth embodiment of the present invention.

The daylighting system of the present embodiment resembles, for example, the daylighting system of the second embodiment described above and differs, as shown in FIGS. 14A to 14C, in that the light-transmitting device 50 includes composite slats 57 each of which in turn includes: a shading section 55 over the interior face 1001a of the window pane 1001; and a light-transmitting section 56 joined obliquely to the shading section 55.

The light-transmitting device 50 includes a window shade in which the multiple composite slats 57 are tied together with strings. Each of the multiple composite slats 57, constituting the light-transmitting device 50, has a V-like shape in the cross-section thereof taken perpendicular to the lengthwise direction thereof. The V-like shape has an apex angle α of, for example, 150°. The multiple composite slats 57 are tied together with strings so that the apex angles α point at the ceiling 1002a of the room model 1000. The apex angles α are adjusted as appropriate in accordance with the traveling direction of the light to be guided into the room 1002.

The light-transmitting sections 56 are made of a material that is similar to the material for the transparent slats described above.

The shading sections 55 are made of a material that is similar to the material for the opaque slats described above.

In the daylighting system of the present embodiment, as shown in FIG. 14B, the composite slats 57 can be rotated so that the shading sections 55 are positioned parallel to the interior face 1001a of the window pane 1001, which decreases the amount of light incident to the window pane 1001. The light incident to the window pane 1001 is directed only at the ceiling 1002a. Meanwhile, as shown in FIG. 14C, the composite slats 57 can be rotated so that the light-transmitting sections 56 face the interior face 1001a of the window pane 1001, which increases the amount of light entering the room 1002.

Lighting-Modulation System

Figure 15:
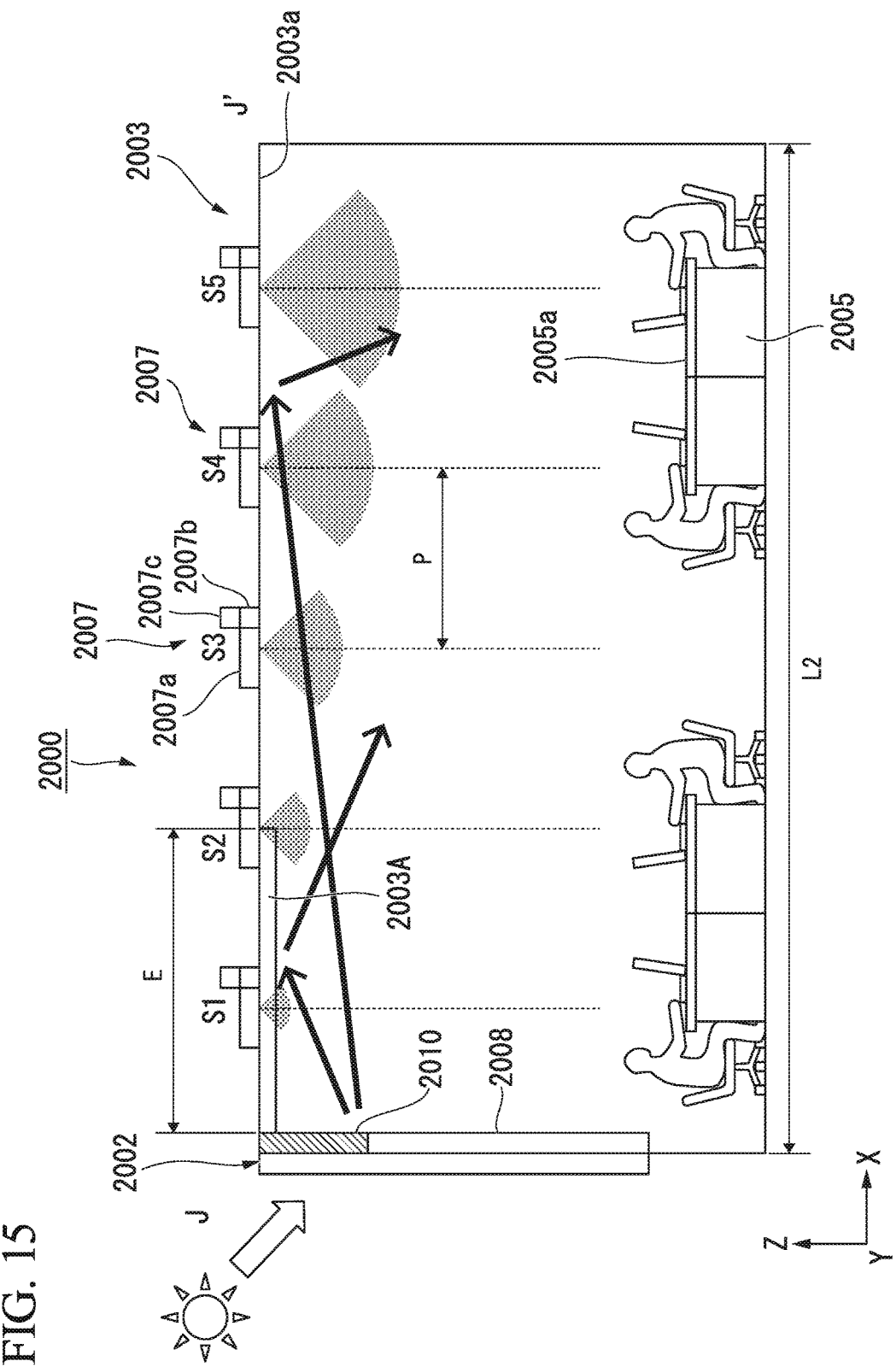
FIG. 15 is a cross-sectional view, taken along line J-J' in FIG. 16, of a room model in which a daylighting device and a lighting-modulation system are installed.
Figure 16:
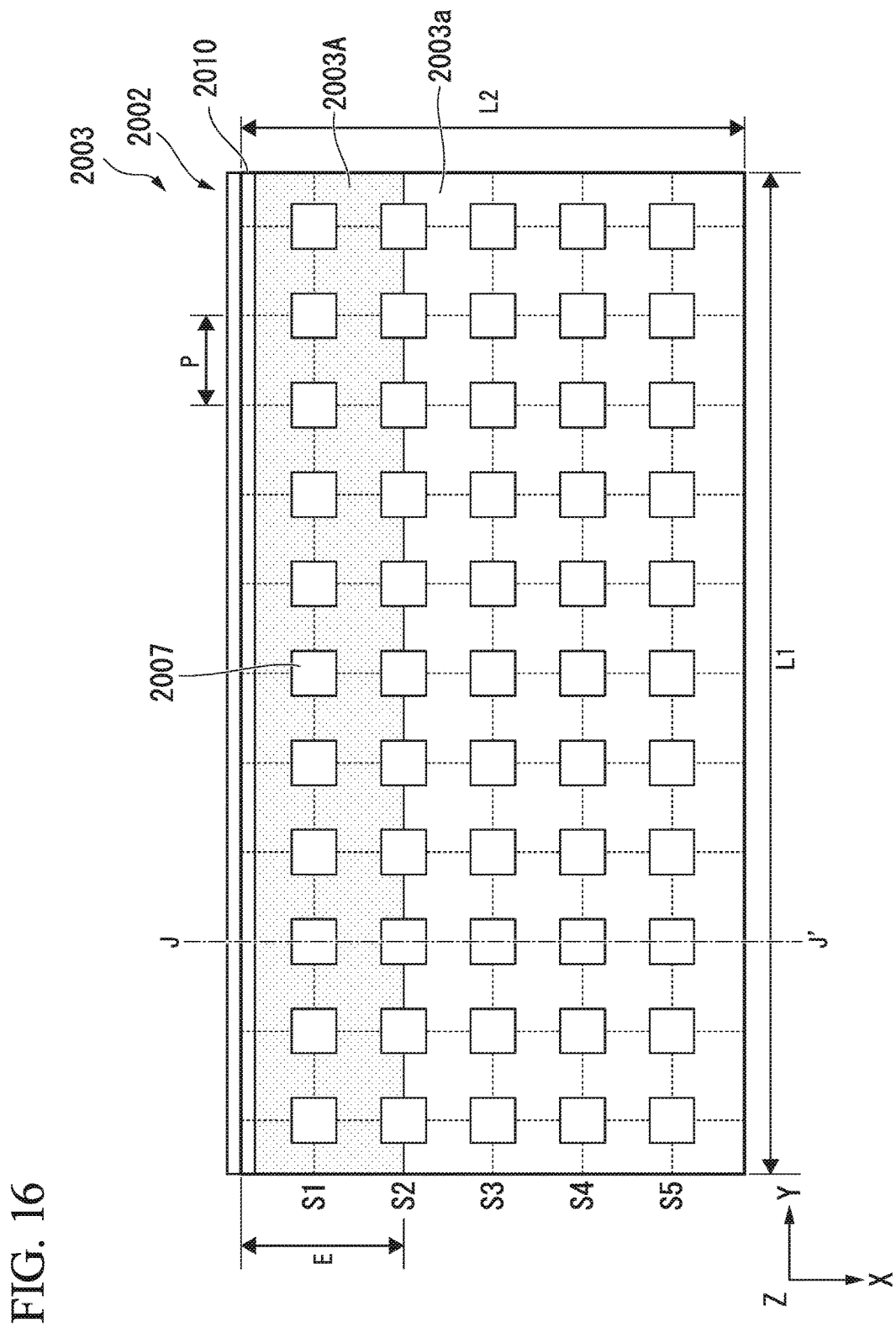
FIG. 16 is a plan view of a ceiling of the room model.

FIG. 15 is a cross-sectional view, taken along line J-J' in FIG. 16, of a room model in which a daylighting system and a lighting-modulation system are installed. FIG. 16 is a plan view of a ceiling of the room model 2000.

In the room model 2000, a room 2003 into which external light is guided has a ceiling 2003a constituted partly by a ceiling material that may have high light-reflecting properties. Referring to FIGS. 15 and 16, the ceiling 2003a of the room 2003 is provided with a tight-reflecting ceiling material 2003A as the ceiling material having such light-reflecting properties. The light-reflecting ceiling material 2003A is for facilitating the guiding of external light from a daylighting system 2010 installed over a window 2002 deep into the interior. The light-reflecting ceiling material 2003A is disposed on a part of the ceiling 2003a that is close to the window, specifically, on a predetermined part E of the ceiling 2003a (approximately up to 3 meters from the window 2002).

The light-reflecting ceiling material 2003A, as described above, serves to efficiently direct deep into the interior the external light guided indoors through the window 2002 on which the daylighting system 2010 (any of the daylighting systems of the abovementioned embodiments) is installed. The external light guided in the direction of the indoor ceiling 2003a by the daylighting system 2010 is reflected by the light-reflecting ceiling material 2003A, hence changing direction and illuminating a desk top face 2005a of a desk 2005 located deep in the interior. Thus, the light-reflecting ceiling material 2003A has an effect of brightly lighting up the desk top face 2005a.

The light-reflecting ceiling material 2003A may be either diffuse reflective or specular reflective. Preferably, the light-reflecting ceiling material 2003A has a suitable mix of these properties to achieve both the effect of brightly lighting up the desk top face 2005a of the desk 2005 located deep in the interior and the effect of mitigating glare which is uncomfortable to occupants.

Much of the light guided indoors by the daylighting system 2010 travels in the direction of the part of the ceiling that is close to the window 2002. Still, the part of the interior that is close to the window 2002 often has sufficient lighting. Therefore, the light that strikes the ceiling near the window (part E) can be partially diverted to a deep part of the interior where lighting is poor compared to the part near the window, by additionally using the light-reflecting ceiling material 2003A described here.

The light-reflecting ceiling material 2003A may be manufactured, for example, by embossing irregularities each of approximately several tens of micrometers on an aluminum or similar metal plate or by vapor-depositing a thin film of aluminum or a similar metal on the surface of a resin substrate having similar irregularities formed thereon. Alternatively, the embossed irregularities may be formed from a curved surface with a higher cycle.

Furthermore, the embossed shape formed on the light-reflecting ceiling material 2003A may be changed as appropriate to control light distribution properties thereof and hence resultant indoor light distribution. For example, if stripes extending deep into the interior are embossed, the light reflected by the light-reflecting ceiling material 2003A is spread to the left and right of the window 2002 (in the directions that intersect the length of the irregularities). When the window 2002 of the room 2003 is limited in size or orientation, these properties of the light-reflecting ceiling material 2003A can be exploited to diffuse light in horizontal directions and at the same time to reflect the light deep into the room.

The daylighting system 2010 is used as a part of a lighting-modulation system for the room 2003. The lighting-modulation system includes, for example, the daylighting system 2010, a plurality of room lighting devices 2007, an insolation adjustment device 2008 installed over the window, a control system for these devices, the light-reflecting ceiling material 2003A installed on the ceiling 2003a, and other structural members of the whole room.

The window 2002 of the room 2003 has the daylighting system 2010 installed over an upper portion thereof and the insolation adjustment device 2008 installed over a lower portion thereof. In this example, the insolation adjustment device 2008 is a window shade, which is by no means intended to limit the scope of the invention.

In the room 2003, the room lighting devices 2007 are arranged in a lattice in the left/right direction (Y direction) of the window 2002 and in the depth direction of the room (X direction). These room lighting devices 2007, as well as the daylighting system 2010, constitute an illumination system for the whole room 2003.

Referring to FIGS. 15 and 16 illustrating the office ceiling 2003a, for example, the window 2002 has a length L1 of 18 meters in the left/right direction (Y direction), and the room 2003 has a length L2 (depth) of 9 meters in the X direction. The room lighting devices 2007 in this example are arranged in a lattice in the length (Y direction) and depth (X direction) of the ceiling 2003a at intervals P each of 1.8 meters. More specifically, a total of 50 room lighting devices 2007 is arranged in a lattice of 10 rows (Y direction) and 5 columns (X direction).

Each room lighting device 2007 includes an interior lighting fixture 2007a, a brightness detection unit 2007b, and a control unit 2007c. The brightness detection unit 2007b and the control unit 2007c are integrated into the interior lighting fixture 2007a to form a single structure.

Each room lighting device 2007 may include two or more interior lighting fixtures 2007a and two or more brightness detection units 2007b, with one brightness detection unit 2007b for each interior lighting fixture 2007a. The brightness detection unit 2007b receives a reflection off the face illuminated by the interior lighting fixture 2007a to detect illuminance on that face. In this example, the brightness detection unit 200b detects illuminance on the desk top face 2005a of the desk 2005 located indoors.

The control units 2007c, each for a different one of the room lighting devices 2007, are connected to each other. In each room lighting device 2007, the control unit 2007c, connected to the other control units 2007c, performs feedback control to adjust the light output of an LED lamp in the interior lighting fixture 2007a so that the illuminance on the desk top face 2005a detected by the brightness detection unit 2007b is equal to a predetermined target illuminance L0 (e.g., an average illuminance: 750 lx).

Figure 17:
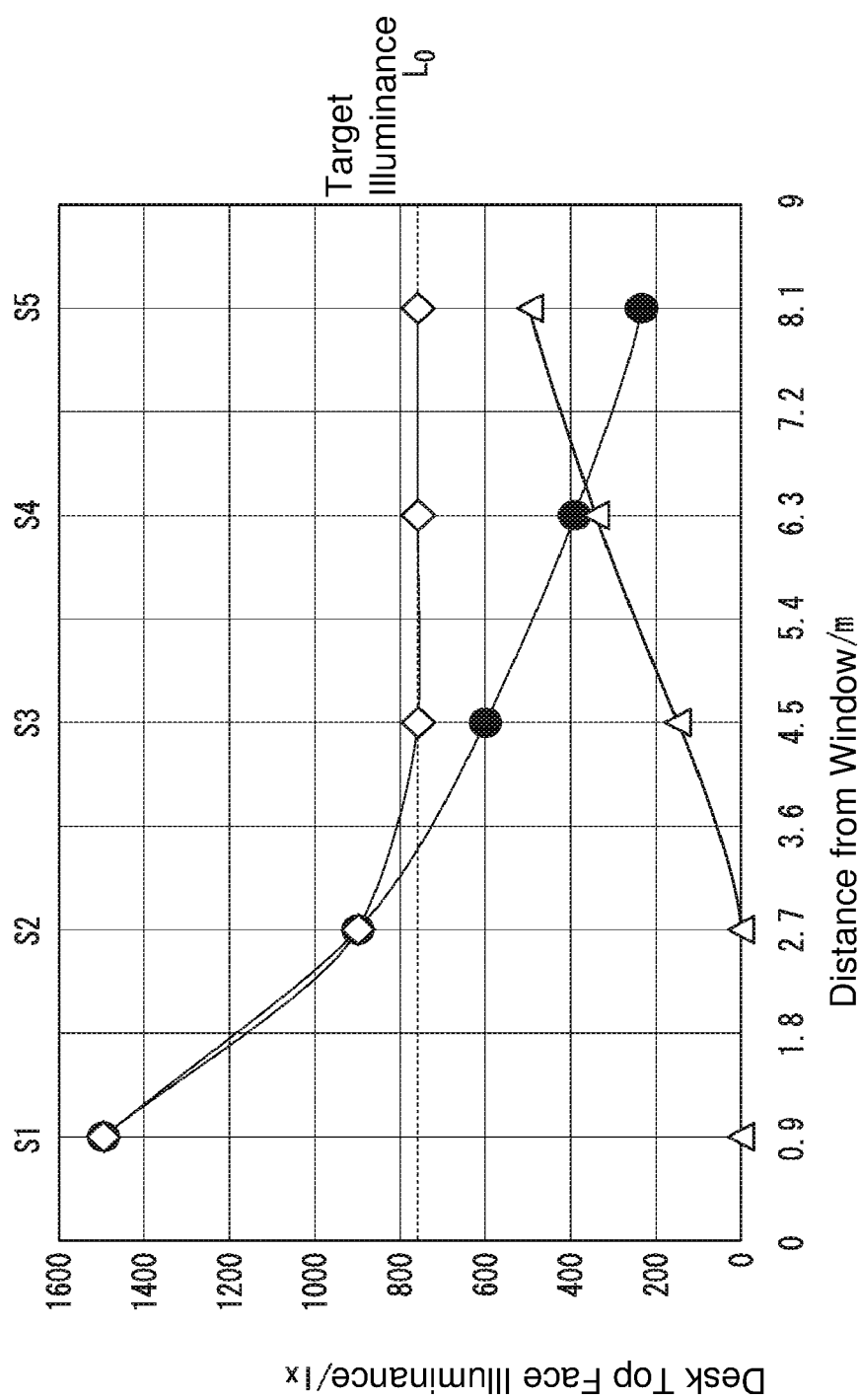
FIG. 17 is a graph representing a relationship between the illuminance produced by daylighting light (natural light) guided into the interior (guided indoors) by a daylighting device and the illuminance produced by room lighting devices (lighting-modulation system).

FIG. 17 is a graph representing a relationship between the illuminance produced by the daylighting light (natural light) guided into the interior by the daylighting device and the illuminance produced by the room lighting devices (lighting-modulation system). In FIG. 16, the vertical axis indicates illuminance (lx) on the desk top face, and the horizontal axis indicates distance (meters) from the window. The broken line in the figure indicates the target indoor illuminance. Each black circle denotes an illuminance produced by the daylighting device, each white triangle denotes an illuminance produced by the room lighting devices, and each white diamond denotes a total illuminance.

Referring to FIG. 17, the desk top face illuminance attributable to the daylighting light guided by the daylighting system 2010 is highest at the window and decreases with increasing distance from the window. This illuminance distribution in the depth direction of the room is caused during daytime by natural daylight coming through a window in the room in which the daylighting system 2010 is installed. Accordingly, the daylighting system 2010 is used in combination with the room lighting devices 2007 which enhance the indoor illuminance distribution. Each room lighting device 2007, disposed on the interior ceiling, detects an average illuminance below that device by means of the brightness detection unit 2007b and lights up in a modulated manner so that the desk top face illuminances across the whole room are equal to the predetermined target illuminance L0. Therefore, a column S1 and a column S2 near the window only dimly light up, whereas a column S3, a column S4, and a column S5 light up to produce output that increases with increasing depth into the room (increases in the order of the column S3, the column S4, and the column S5). Consequently, the desk top faces across the whole room are lit up by the sum of the illumination by natural daylight and the illumination by the room lighting devices 2007 at a desk top face illuminance of 750 lx, which is regarded as sufficient for desk work (see, JIS Z9110, General Rules of Recommended Lighting Levels, Recommended Illuminance at Offices).

As described above, light can be delivered deep into the interior by using both the daylighting system 2010 and the lighting-modulation system (room lighting devices 2007) together. This can in turn further improve indoor brightness and ensure a sufficient desk top face illuminance for desk work across the whole room, hence realizing a more stable, brightly lit environment independently from the season or the weather.

INDUSTRIAL APPLICABILITY

The present invention, in one aspect thereof, is applicable to window panes, roll screens, and daylighting louvers.

REFERENCE SIGNS LIST

10, 40, 70, 90, 100, 110, 130, 140, 160, 180, 190, 200 Daylighting System
20, 50 Light-transmitting Device
30, 60 Shading Device
51 Slat
52 Scattering Plate
53, 152 Protrusion Portion
54 Prism
55 Shading Section
56 Light-transmitting Section
57 Composite Slat
80, 120, 150 Daylighting Device
81, 153 Daylighting Sheet
82 First Glass Substrate (First Substrate)
83 Light-diffusion Sheet
84 Second Glass Substrate (Second Substrate)
85 Frame (Support Member)
86 Spacer
87, 151 Base Member
88 Protrusion Portion
170 Light-diffusion Device
1000 Room Model
1001 Window Pane
1002 Room
1100 Window Pane
1101 Glass Plate (First Glass Plate)
1102 Glass Plate (Second Glass Plate)
1103 Spacer

The invention claimed is:
1. A daylighting system to be installed to a window pane, the daylighting system comprising:
a light-transmitting device to be disposed over an upper part of an interior face of the window pane, and
a shading device joined to the light-transmitting device in such a manner as to be disposed over a lower part of the interior face,
wherein a first height of the light-transmitting device is smaller than a second height of the shading device, wherein
the light-transmitting device is made of a plurality of light-transmitting slats which are made of transparent material,
each of the plurality of light-transmitting slats has a first lengthwise direction,
each of the plurality of light-transmitting slats has a V-like shape when viewed in the first lengthwise direction,
a plurality of first protrusion portions having light-transmitting properties are arranged on one face of each of the plurality of light-transmitting slats, and
each of the plurality of first protrusion portions has a second lengthwise direction,
wherein the shading device is made of a plurality of shading slats which are made of opaque material.

2. The daylighting system according to claim 1, the daylighting system further comprising:
a daylighting device disposed over the light-transmitting device.

3. The daylighting system according to claim 2, wherein the daylighting device comprises:
a base member having light-transmitting properties; and
a plurality of second protrusion portions having light-transmitting properties, the plurality of second protrusion portions being disposed adjacent to each other on a face of the base member.

4. The daylighting system according to claim 2, wherein the daylighting device is disposed over the interior face.

5. The daylighting system according to claim 2,
wherein the daylighting device is disposed inside the window pane between a first glass plate and a second glass plate over a light-incident face of the window pane.

6. The daylighting system according to claim 5, the daylighting system further comprising:
a light-diffusion device configured to diffuse light over the daylighting device.

7. The daylighting system according to claim 1,
wherein the light-transmitting device is anisotropic with respect to light-diffusion in such a manner that the light-transmitting device is highly diffusive in horizontal directions.

8. The daylighting system according to claim 1,
wherein the light-transmitting device has at least one prismatic structure that changes a traveling direction of light vertically.

9. The daylighting system according to claim 8,
wherein the at least one prismatic structure comprises two or more types of prismatic structures in accordance with distance from a ceiling.

10. The daylighting system according to claim 1,
wherein the light-transmitting device comprises composite slats each in turn including:
a shading section over a face of the window pane; and
a light-transmitting section joined obliquely to the shading section.

11. The daylighting system according to claim 1,
wherein the light-transmitting device and the shading device are capable of being independently moved up/down over a face of the window pane.

12. The daylighting system according to claim 1,
wherein each of the plurality of light-transmitting slats are made of first and second flat plates, and the plurality of first protrusion portions are arranged on one face of one of the first and second flat plates.

13. The daylighting system according to claim 12, wherein the plurality of first protrusion portions are arranged such that the second lengthwise direction is perpendicular to the first lengthwise direction.

14. The daylighting system according to claim 12, wherein the plurality of first protrusion portions are arranged such that the second lengthwise direction is parallel to the first lengthwise direction.

* * * * *